US011412397B2

(12) United States Patent
Yamamoto et al.

(10) Patent No.: US 11,412,397 B2
(45) Date of Patent: Aug. 9, 2022

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/794,493

(22) Filed: Feb. 19, 2020

(65) Prior Publication Data

US 2020/0187030 A1 Jun. 11, 2020

Related U.S. Application Data

(63) Continuation of application No. 15/653,148, filed on Jul. 18, 2017, now Pat. No. 10,609,580, which is a (Continued)

(30) Foreign Application Priority Data

Jul. 28, 2015 (JP) ................. 2015-148542

(51) Int. Cl.
*H04W 24/06* (2009.01)
*H04B 7/10* (2017.01)
(Continued)

(52) U.S. Cl.
CPC ............ *H04W 24/06* (2013.01); *H04B 7/084* (2013.01); *H04B 7/0837* (2013.01); *H04B 7/10* (2013.01);
(Continued)

(58) Field of Classification Search
CPC ........... H04B 7/10; H04L 1/08; H04L 5/0048; H04L 5/0053; H04L 27/2613; H04W 4/70;
(Continued)

(56) References Cited

U.S. PATENT DOCUMENTS

2012/0281654 A1   11/2012   Aiba et al.
2013/0170466 A1    7/2013   Nishio et al.
(Continued)

FOREIGN PATENT DOCUMENTS

| JP | 2015-006003 A | 1/2015 |
| WO | 2012/049804 A1 | 4/2012 |
| WO | 2013/005377 A1 | 1/2013 |

OTHER PUBLICATIONS

3GPP TSG RAN WG1 Meeting #81, R1-152845, "Considerations of legacy SRS impact on uplink transmission from low-cost UE", May 2015.
(Continued)

*Primary Examiner* — Harun Chowdhury
(74) *Attorney, Agent, or Firm* — Seed IP Law Group LLP

(57) ABSTRACT

A repeater generates repetition signals by repeating uplink signals over a plurality of subframes; controller sets a timing for transmitting the repetition signals, based on information indicating a transmission candidate subframe for a sounding reference signal used for measuring an uplink reception quality; and a transmitter transmits the repetition signals at the set timing.

16 Claims, 14 Drawing Sheets

Related U.S. Application Data continuation of application No. PCT/JP2016/001292, filed on Mar. 9, 2016.

(51) Int. Cl.

| | | |
|---|---|---|
| *H04L 27/26* | (2006.01) | |
| *H04L 5/00* | (2006.01) | |
| *H04B 7/08* | (2006.01) | |
| *H04B 7/155* | (2006.01) | |
| *H04L 1/08* | (2006.01) | |
| *H04L 1/18* | (2006.01) | |
| *H04B 17/309* | (2015.01) | |
| *H04B 17/00* | (2015.01) | |
| *H04W 72/08* | (2009.01) | |

(52) U.S. Cl.
CPC ..... *H04B 7/15528* (2013.01); *H04B 17/0085* (2013.01); *H04B 17/309* (2015.01); *H04L 1/08* (2013.01); *H04L 1/1845* (2013.01); *H04L 5/0048* (2013.01); *H04L 5/0051* (2013.01); *H04L 27/2613* (2013.01); *H04L 5/005* (2013.01); *H04W 72/085* (2013.01)

(58) Field of Classification Search
CPC . H04W 24/06; H04W 72/1268; H04W 52/36; H04W 52/42; H04W 72/04
USPC ......................................... 370/203, 329, 330
See application file for complete search history.

(56) References Cited

U.S. PATENT DOCUMENTS

| | | | | |
|---|---|---|---|---|
| 2014/0092877 A1* | 4/2014 | Kazmi | ................. | H04W 52/36 |
| | | | | 370/336 |
| 2014/0126510 A1 | 5/2014 | Ogawa et al. | | |
| 2015/0036632 A1 | 2/2015 | Nishio et al. | | |
| 2016/0128029 A1* | 5/2016 | Yang | ....................... | H04W 4/70 |
| | | | | 370/329 |
| 2016/0226639 A1* | 8/2016 | Xiong | ....................... | H04L 1/08 |
| 2016/0262182 A1* | 9/2016 | Yang | ..................... | H04W 72/04 |
| 2016/0269939 A1* | 9/2016 | Papasakellariou | .... | H04L 5/0053 |
| 2016/0286555 A1 | 9/2016 | Papasakellariou | | |
| 2018/0083752 A1* | 3/2018 | Kim | ................... | H04W 72/1268 |
| 2018/0109286 A1* | 4/2018 | Yao | ......................... | H04W 4/70 |
| 2018/0109346 A1 | 4/2018 | Sivanesan et al. | | |
| 2018/0213484 A1* | 7/2018 | Oh | ........................ | H04W 52/42 |
| 2018/0220452 A1 | 8/2018 | Sivanesan et al. | | |

OTHER PUBLICATIONS

3GPP TSG RAN WG1 Meeting #81, R1-152913, "Multiple subframe code spreading for MTC UEs", May 2015.

3GPP TSG RAN WG1 Meeting #82, R1-153968, "Handling of collisions between MTC channels and legacy SRS", Aug. 2015.

3GPP TS 36.211, V12.5.0, "3rd Generation Partnership Project; Technical Specification Group Radio Access Network; Evolved Universal Terrestrial Radio Access (E-UTRA); Physical channels and modulation (Release 12)", Mar. 2015.

3GPP TS 36.212, V12.4.0, "3rd Generation Partnership Project; Technical Specification Group Radio Access Network; Evolved Universal Terrestrial Radio Access (E-UTRA); Multiplexing and channel coding (Release 12)", Mar. 2015.

3GPP TS 36.213, V12.5.0, "3rd Generation Partnership Project; Technical Specification Group Radio Access Network; Evolved Universal Terrestrial Radio Access (E-UTRA); Physical layer procedures (Release 12)", Mar. 2015.

3GPP TSG RAN Meeting #65, RP-141660, Ericsson, Nokia Networks, "New WI proposal: Further LTE Physical Layer Enhancements for MTC", Sep. 2014.

3GPP TSG RAN WG1 Meeting #80, R1-150312, Panasonic, "Discussion and performance evaluation on PUSCH coverage enhancement", Feb. 2015.

3GPP TSG RAN WG1 Meeting #81, R1-152528, "LS Out on Additional Aspects for MTC", May 2015.

3GPP TSG RAN WG1 Meeting #80bis, R1-151454, MCC Support, "Final Report of 3GPP TSG RAN WG1 #80 v1.0.0", Apr. 2015.

International Search Report of PCT application No. PCT/JP2016/001292 dated May 31, 2016.

LG Electronics, "Details on SR repetition and SRS transmission for MTC UE", 3GPP TSG RAN WG1 Meeting #81, R1-152705_SR and SRS_V3, 3rd Generation Partnership Project (3GPP), Mobile Competence Centre ; 650, Route Des Lucioles ; F-06921 Sophia-Antipolis Cedex; France, Fukuoka, Japan; May 25-2015-May 29, 2015 May 24, 2015 (May 24, 2015), XP050973723, Retrieved from the Internet: URL:http://www.3gpp.org/ftp/Meetings_3GPP_SYNC/RAN1/Docs/ [retrieved on May 24, 2015], 4 pages.

The Extended European Search Report dated Jul. 3, 2018 for the related European Patent Application No. 16829975.8-1219 / 331297, 9 pages.

\* cited by examiner

FIG. 2

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TERMINAL, BASE STATION, TRANSMISSION METHOD, AND RECEPTION METHOD

BACKGROUND

1. Technical Field

The present disclosure relates to a terminal, a base station, a transmission method, and a reception method.

2. Description of the Related Art

In the 3rd Generation Partnership Project Long Term Evolution (3GPP LTE), Orthogonal Frequency Division Multiple Access (OFDMA) is employed as a system for downlink communication from a base station (which may be called an eNB) to a terminal (which may be called UE (User Equipment)). Single Carrier-Frequency Division Multiple Access (SC-FDMA) is employed as a system for uplink communication from a terminal to a base station (e.g., see 3GPP TS 36.211 V12.5.0, "Evolved Universal Terrestrial Radio Access (E-UTRA), Physical channels and modulation (Release 12)," March 2015 (which may hereinafter be referred to as "Non-Patent Document 1"); 3GPP TS 36.212 V12.4.0, "Evolved Universal Terrestrial Radio Access (E-UTRA), Multiplexing and channel coding (Release 12)" March 2015 (which may hereinafter be referred to as "Non-Patent Document 2"); and 3GPP TS 36.213 V12.5.0, "Evolved Universal Terrestrial Radio Access (E-UTRA), Physical layer procedures (Release 12)," March 2015 (which may hereinafter be referred to as "Non-Patent Document 3")).

In LTE, a base station performs communication by allocating resource blocks (RBs) in a system band to a terminal in each unit of time called a subframe. FIG. 1 illustrates a structure example of a subframe in an LTE uplink shared channel (Physical Uplink Shared Channel (PUSCH)). As illustrated in FIG. 1, one subframe is constituted by two time slots. In each slot, a plurality of SC-FDMA data symbols and a demodulation reference signal (DMRS) are time-multiplexed. Upon receiving PUSCH, the base station performs channel estimation using the DMRS. Thereafter, by using a result of the channel estimation, the base station demodulates/decodes the SC-FDMA data symbols.

In an LTE uplink, in order to measure the uplink channel quality between the base station and the terminal, a sounding reference signal (SRS) is used (e.g., see Non-Patent Document 1). The SRS is mapped to an SRS resource and is transmitted from the terminal to the base station. In this case, the base station performs cell-specific higher-layer indication to set an SRS resource candidate group including SRS resource candidates that are common to all terminals that are present in a cell of interest. Thereafter, the base station performs higher layer indication for each terminal to allocate SRS resources, which are a subset of the SRS resource candidate group, to each terminal to which the SRS resources are to be allocated. Each terminal maps an SRS to the allocated SRS resources to transmit the SRS to the base station. Each SRS resource candidate is a last SC-FDMA symbol in a subframe that is a candidate for SRS transmission (an SRS transmission candidate subframe). Also, in symbols that are SRS resource candidates, all terminals in a cell for which the SRS resource candidate group is set do not perform data transmissions to thereby prevent a collision between the SRS and data transmissions (PUSCH transmissions).

In LTE, srs-SubframeConfig and so on are defined (e.g., see Non-Patent Document 1) as cell-specific higher-layer signaling for setting the SRS resource candidate group. FIG. 2 illustrates one example of the definition of srs-SubframeConfig. Srs-SubframeConfig numbers (0 to 15) in FIG. 2 are transmitted from the base station to the terminal to thereby give an instruction from the base station to the terminal with respect to an SRS transmission period ($T_{SFC}$) and an offset value ($\Delta_{SFC}$) for giving an instruction indicating a subframe in which the SRS transmission is to be started. For example, in FIG. 2, when the srs-SubframeConfig number is 4 (Binary=0100), the transmission period $T_{SFC}=5$ and the offset value $\Delta_{SFC}=1$ are given, and thus the second ($=1+\Delta_{SFC}$) subframe, the seventh ($=1+\Delta_{SFC}+(T_{SFC}\times 1)$) subframe, the 12th ($=1+\Delta_{SFC}+(T_{SFC}\times 2)$) subframe, ..., and the ($1+\Delta_{SFC}+(T_{SFC}\times n)$)th subframe are SRS transmission candidate subframes (e.g., see FIG. 3).

Meanwhile, in recent years, machine-to-machine (M2M) communication for realizing services through autonomous communication between appliances without involvement of user decision has been expected to be a scheme for supporting the future information society. A smart grid is available as a specific application case of an M2M system. The smart grid is an infrastructure system for efficiently providing life-supporting lines for electricity, gas, or the like, and M2M communication is executed between a smart meter installed in each home or building and a central server to autonomously and effectively adjust a demand balance of resources. Other application cases of the M2M communication system include, for example, a monitoring system for goods management, environmental sensing, remote medical care, or the like, and remote management for inventory or charging in an automatic vending machine.

In the M2M communication system, particularly, use of a cellular system having a wide communication area is attracting attention. In 3GPP, in formulation of LTE and LTE-Advanced standards, standardization for cellular network enhancement for M2M, called machine type communication (MTC), is conducted (e.g., RP-141660, Ericsson, Nokia Networks, "New WI proposal: Further LTE Physical Layer Enhancements for MTC," September 2014 (which may hereinafter be referred to as "Non-Patent Document 4")), and a study is carried on specifications in which lower cost, power consumption reduction, and coverage enhancement (Coverage Enhancement) are requested conditions. In particular, in terminals, such as smart meters, that hardly move, ensuring coverage is a condition in terms of providing services, unlike handset terminals that are often used while users thereof are moving. Thus, "coverage enhancement (MTC coverage enhancement)" to further increase the communication areas is a challenge in order to deal with cases in which terminals (MTC terminals) that support MTC are provided at unavailable places, such as basements of buildings, in existing LTE and LTE-Advanced communication areas.

In order to further increase the communication areas, a "repetition" technique for repeatedly transmitting the same signal a plurality of times is being studied in the MTC coverage enhancement. In the repetition, signals repeatedly transmitted are combined together to thereby improve reception signal power and increase the coverage (the communication areas).

In addition, when attention is focused on the fact that an environment in which MTC terminals that require coverage enhancement hardly move and channels do not vary with time is envisaged, a technology for improving the channel estimation accuracy can be used.

One available technology for improving the channel estimation accuracy is "cross-subframe channel estimation and symbol level combining" (e.g., see R1-150312, Panasonic, "Discussion and performance evaluation on PUSCH coverage enhancement" (which may hereinafter be referred to as "Non-Patent Document 5")). In the cross-subframe channel estimation and the symbol level combining, the base station performs, for each symbol, coherent combining on signals, repeatedly transmitted over a plurality of subframes ($N_{Rep}$ subframes), over a number of subframes (X subframes) which is the same as or smaller than the number of repetitions, as illustrated in FIG. 4. Thereafter, the base station uses a DMRS resulting from the coherent combining to perform channel estimation and uses an obtained channel estimation result to demodulate/decode SC-FDMA data symbols.

When the number (X) of subframes which is a unit with which the cross-subframe channel estimation and the symbol level combining are performed is smaller than the number of repetitions ($N_{Rep}$), the base station combines ($N_{Rep}/X$) symbols resulting from the demodulation/decoding.

It has become apparent that use of the cross-subframe channel estimation and the symbol level combining makes it possible to improve the PUSCH transmission quality, compared with simple repetition in which channel estimation and SC-FDMA data symbol demodulation/decoding are performed for each subframe (e.g., see R1-150312, Panasonic, "Discussion and performance evaluation on PUSCH coverage enhancement" (which may hereinafter be referred to as "Non-Patent Document 5")).

In cells that support MTC terminals, it is necessary to make the MTC terminals and existing LTE terminals coexist, and it is desirable to support the MTC terminals so as to minimize influences on the existing LTE systems. Thus, for example, in uplink transmission (e.g., PUSCH transmission) of an MTC terminal (an MTC coverage enhancement terminal) which requires repetition transmission, no data transmission is performed with SRS resource candidates, as described above, in order to prevent a collision with an SRS of an existing LTE system. This makes it possible to prevent a collision between an SRS and data transmissions of the MTC coverage enhancement terminal.

Meanwhile, the above-described technology for improving the channel estimation accuracy assumes that reception signals over a plurality of subframes (X subframes) can be subjected to coherent combining, and is based on the premise that transmission-signal phase discontinuity does not occur in at least X subframes in the repetition transmission. In the repetition transmission, there is also the consideration that the transmission-signal phase discontinuity does not occur, unless the transmit power and the central frequency of radio frequencies (RFs) change (e.g., see R1-152528, RAN4, "LS Out on Additional Aspects for MTC," May 2015 (which may hereinafter be referred to as "Non-Patent Document 6")).

However, when any of subframes in which the repetition transmission is performed is an SRS transmission candidate subframe, no data is transmitted in a last SC-FDMA symbol in the SRS transmission candidate subframe. In this case, since the transmit power for the last SC-FDMA symbol in the SRS transmission candidate subframe becomes 0, a change in the transmit power occurs in a repetition transmission duration. Thus, the condition on which the above-described transmission-signal phase discontinuity does not occur is not satisfied, and thus there is a possibility that phase discontinuity occurs in repetition signals. When the transmission-signal phase discontinuity occurs as described above, the base station becomes unable to perform coherent combining on reception signals over X subframes and thus cannot sufficiently obtain the effect of improving the channel estimation accuracy.

One non-limiting and exemplary embodiment provides a base station, a terminal, a transmission method, and a reception method that can improve the channel estimation accuracy by performing cross-subframe channel estimation and symbol level combining.

SUMMARY

In one general aspect, the techniques disclosed here feature a terminal including: a repeater (repetition unit) that generates repetition signals by repeating uplink signals over a plurality of subframes; a controller (control unit) that sets a timing for transmitting the repetition signals, based on information indicating a transmission candidate subframe for an SRS used for measuring an uplink channel quality; and a transmitter (transmitting unit) that transmits the repetition signals at the set timing.

It should be noted that general or specific embodiments may be implemented as a system, a method, an integrated circuit, a computer program, a storage medium, or any selective combination thereof.

According to one aspect of the present disclosure, it is possible to improve the channel estimation accuracy by performing cross-subframe channel estimation and symbol level combining.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a table illustrating one example of the definition of srs-SubframeConfig;

DETAILED DESCRIPTION

Embodiments of the present disclosure will be described below in detail with reference to the accompanying drawings.

[Overview of Communication System]

A communication system according to each embodiment of the present disclosure includes a base station 100 and a terminal 200 that support, for example, an LTE-Advanced system.

Also, assume a case in which the terminal 200 (an MTC coverage enhancement terminal) to which an MTC coverage enhancement mode is applied is present in a cell of the base station 100. For example, when the MTC coverage enhancement mode is applied, the above-described technology for improving the channel estimation accuracy is applied to the terminal 200.

Also, in MTC for which a study on specifications is promoted by LTE-Advanced Release 13, MTC terminals support only a 1.4 MHz frequency bandwidth (which may be referred to as an "MTC narrowband") in order to achieve lower cost of terminals. Also, frequency hopping has been introduced in which the 1.4 MHz frequency band to which transmission signals of an MTC terminal are allocated are hopped every certain subframes in a system band (e.g., see R1-151454, MCC Support, "Final Report of 3GPP TSG RAN W G1 #80 v1.0.0," February 2015 (which may hereinafter be referred to as "Non-Patent Document 7")).

When the frequency hopping is applied, the above-described technology for improving the channel estimation accuracy also needs to be applied at the same time, and thus, an MTC terminal needs to transmit signals in X subframes by using the same resource. It is also conceivable to reserve one subframe (1 ms) or so as a time (retuning time) required for switching carrier frequencies during frequency hopping.

Figure 5:
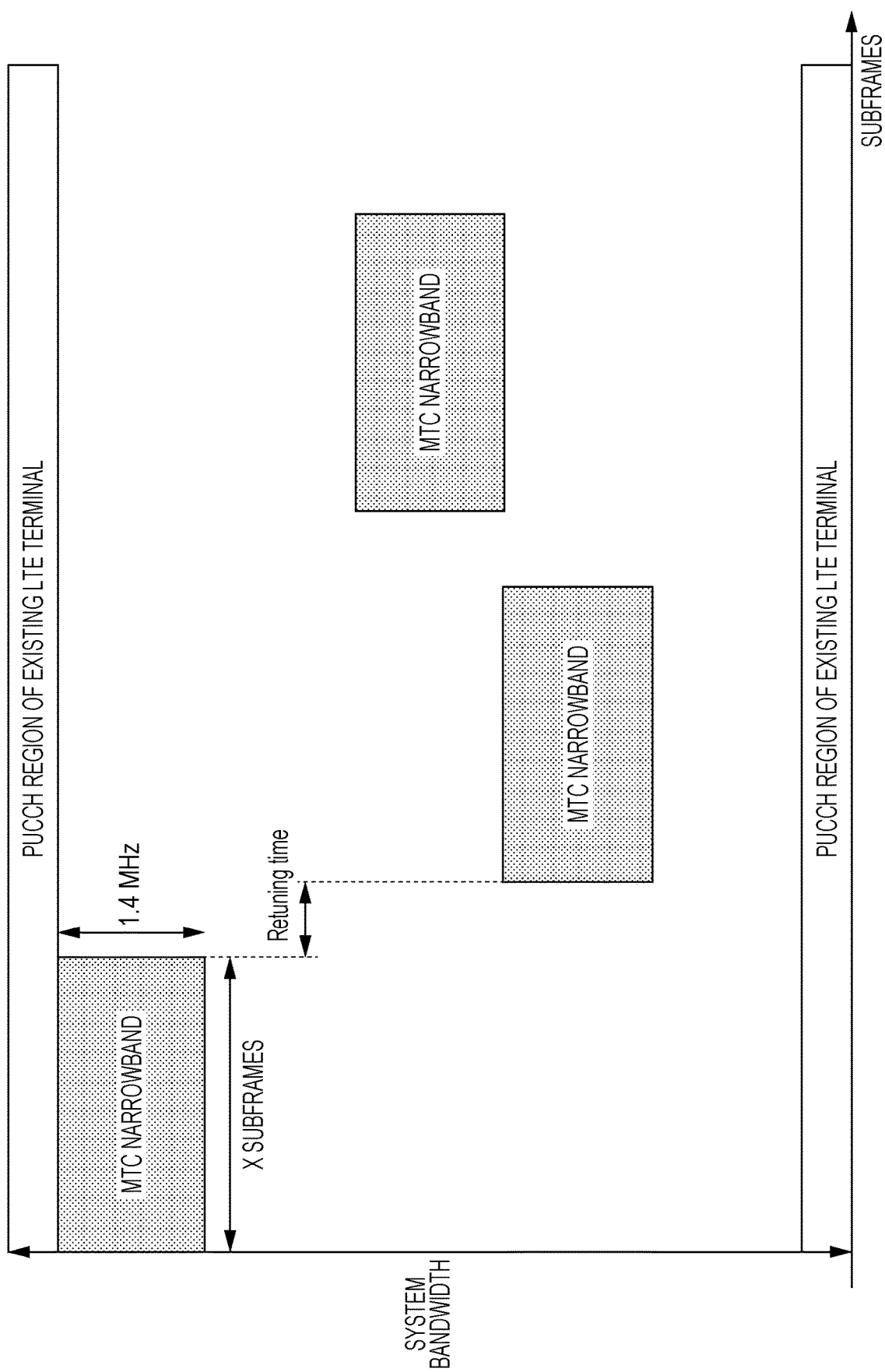
FIG. 5 is a diagram illustrating an arrangement example of MTC narrowbands.

In particular, in uplink transmission of an MTC coverage enhancement terminal which involves a large number of repetitions, it is assumed that the MTC coverage enhancement terminal changes an MTC narrowband (a 1.4 MHz frequency band) (frequency hopping) after transmitting repetition signals in X consecutive subframes by using the same resource and transmits the repetition signals in X consecutive subframes by using the same resource after the change, as illustrated in FIG. 5.

The value (the number of subframes) obtained by adding a parameter X (in FIG. 5, four subframes), which indicates the number of consecutive subframes in which the repetition signals are transmitted, and a retuning time (in FIG. 5, one subframe) may hereinafter be referred to as a parameter Y (in FIG. 5, five subframes) indicating a frequency hopping cycle. The retuning time is not limited to one subframe.

Also, the communication system includes a terminal (not illustrated) that supports an existing LTE system. As described above, in LTE, it is assumed that srs-SubframeConfig and so on illustrated in FIG. 2 are defined as one example of cell-specific higher-layer signaling for setting an SRS resource candidate group.

In this case, in order for the base station 100 to perform cross-subframe channel estimation and symbol level combining, the X subframes need to be consecutive subframes that are not set in an SRS transmission candidate subframe. That is, the value of X needs to be set to be the same as or smaller than the number of consecutive subframes that are not set in an SRS transmission candidate subframe. The number of consecutive subframes that are not set in an SRS transmission candidate subframe is, for example, four subframes for srs-SubframeConfig=3 (for $T_{SFC}=5$ and $\Delta_{SFC}=\{0\}$) and is, for example, three subframes for srs-SubframeConfig=7 (for $T_{SFC}=5$ and $\Delta_{SFC}=\{0, 1\}$). The same also applies to other srs-SubframeConfig. For example, it can be said that cross-subframe channel estimation and symbol level combining over X=4 subframes work in the case of srs-SubframeConfig=3, 4, 5, 6, 9, 10, 11, 12 in which the number of consecutive subframes that are not set in an SRS transmission candidate subframe is four or more.

Accordingly, in each embodiment of the present disclosure, the base station 100 and the terminal 200 set the positions of X subframes in which the cross-subframe channel estimation and the symbol level combining are to be performed, on the basis of srs-SubframeConfig indicating SRS transmission candidate subframes. This minimizes an influence of a collision between an uplink transmission of an MTC coverage enhancement terminal which requires repetition transmission and an SRS of an existing LTE system, and by using a sufficient number of subframes, the base station 100 can perform cross-subframe channel estimation and symbol level combining, so as to improve the channel estimation accuracy.

The following description will be given of a method for avoiding a collision between a repetition transmission of an MTC coverage enhancement terminal and an SRS of an existing system and for improving the channel estimation accuracy by performing cross-subframe channel estimation and symbol level combining.

Figure 6:
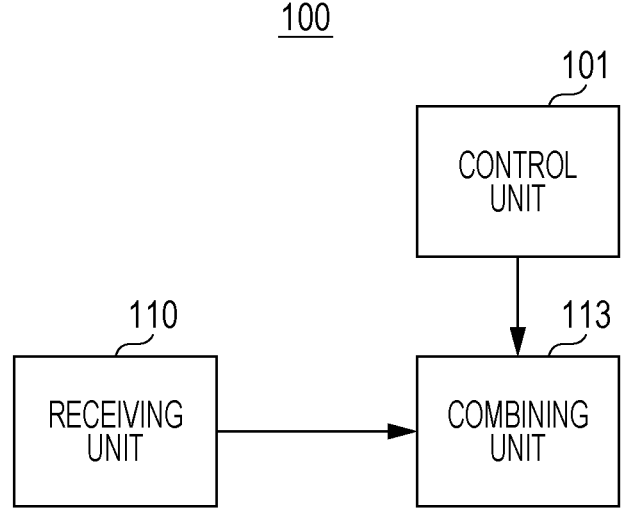
FIG. 6 is a block diagram illustrating the configuration of a major portion of a base station according to a first embodiment.

FIG. 6 is a block diagram illustrating the configuration of a major portion of the base station 100 according to each embodiment of the present disclosure. In the base station 100 illustrated in FIG. 6, on the basis of information (e.g., srs-SubframeConfig) indicating a transmission candidate subframe for a sounding reference signal (SRS) used for measuring an uplink channel quality, a control unit 101 sets a timing at which the terminal 200 transmits the repetition signals generated by repeating an uplink signal over a plurality of subframes. A receiving unit 110 receives the repetition signals, and a combining unit 113 performs coherent combining on the repetition signals in the plurality of subframes, on the basis of the set timing.

Figure 7:
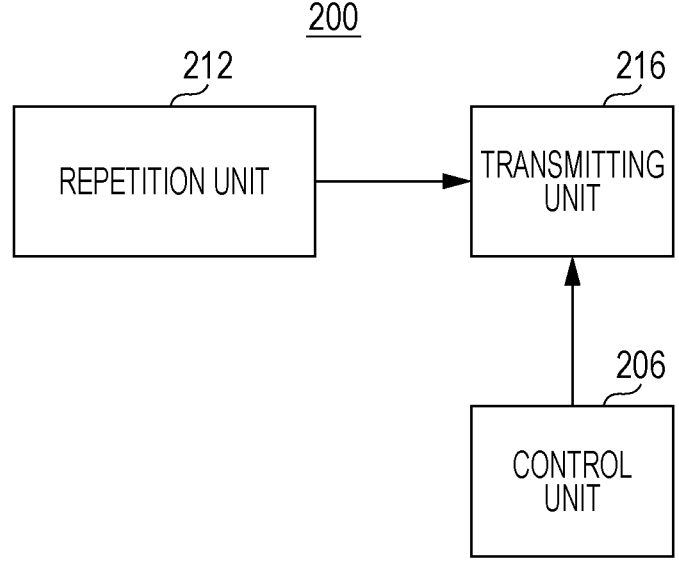
FIG. 7 is a block diagram illustrating the configuration of a major portion of a terminal according to the first embodiment.

Also, FIG. 7 is a block diagram illustrating the configuration of a major portion of the terminal 200 according to each embodiment of the present disclosure. In the terminal 200 illustrated in FIG. 7, a repetition unit 212 repeats an uplink signal over a plurality of subframes to generate repetition signals. A control unit 206 sets a timing for transmitting the repetition signals on the basis of information (e.g., srs-SubframeConfig) indicating a transmission candidate subframe for an SRS used for measuring an uplink channel quality, and a transmitting unit 216 transmits the repetition signals at the set timing.

First Embodiment

[Configuration of Base Station]

Figure 8:
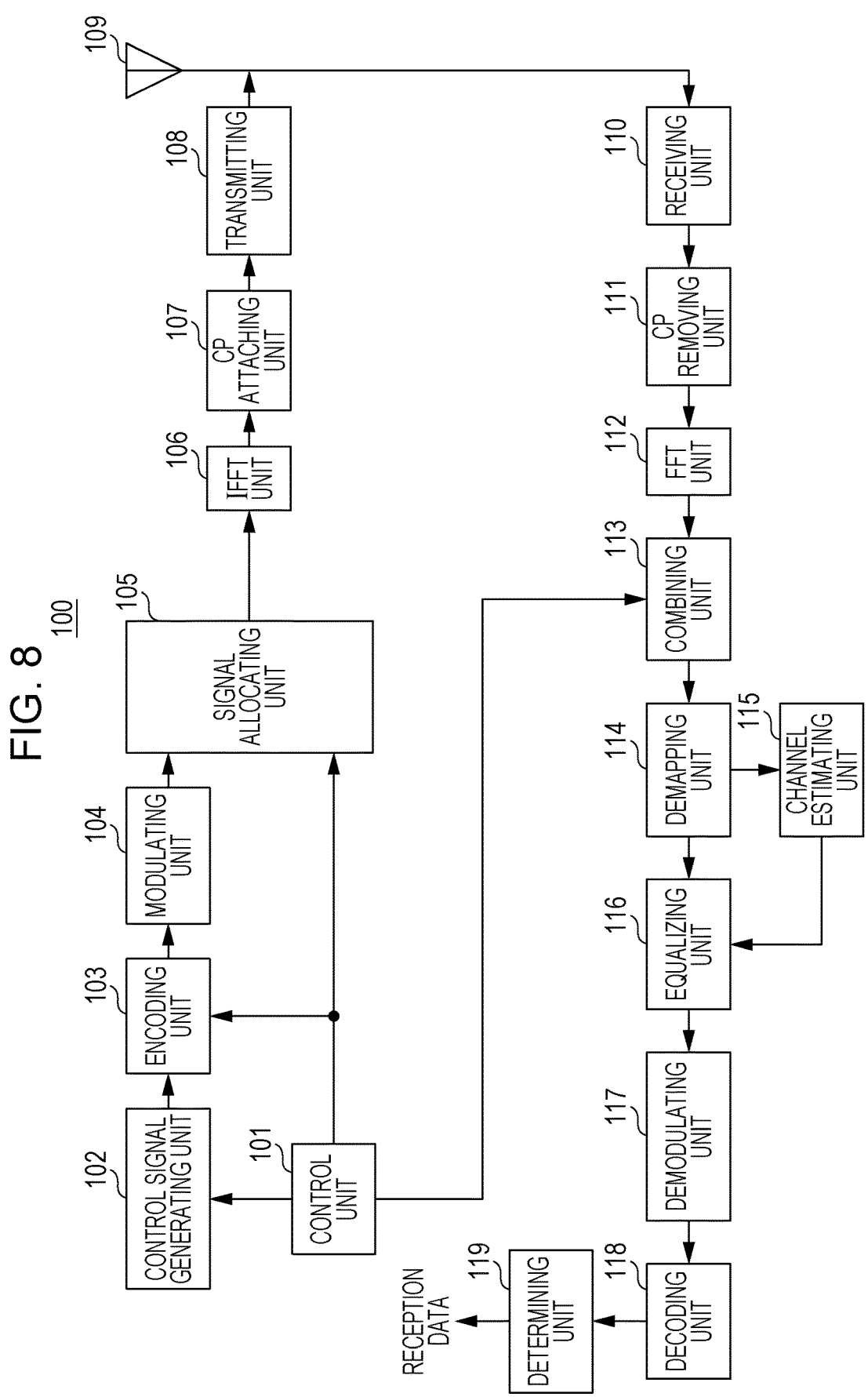
FIG. 8 is a block diagram illustrating the configuration of the base station according to the first embodiment.

FIG. 8 is a block diagram illustrating the configuration of the base station 100 according to a first embodiment of the present disclosure. In FIG. 8, the base station 100 has the control unit 101, a control signal generating unit 102, an encoding unit 103, a modulating unit 104, a signal allocating unit 105, an Inverse Fast Fourier Transform (IFFT) unit 106, a cyclic prefix (CP) attaching unit 107, a transmitting unit 108, an antenna 109, the receiving unit 110, a CP removing unit 111, a Fast Fourier Transform (FFT) unit 112, the combining unit 113, a demapping unit 114, a channel estimating unit 115, an equalizing unit 116, a demodulating unit 117, a decoding unit 118, and a determining unit 119.

Considering the amount of SRS resources needed for each of a plurality of existing LTE terminals that are present in a cell covered by the base station 100, the control unit 101 determines an SRS resource candidate group in the cell and outputs information indicating the determined SRS resource candidate group to the control signal generating unit 102. The SRS resource candidate group is selected, for example, from the table illustrated in FIG. 2.

The control unit 101 identifies, in the SRS resource candidate group, subframes in which the terminal 200 performs PUSCH repetition transmission and outputs information indicating the identified subframes to the combining unit 113.

Also, the control unit 101 determines allocation of PUSCH for an MTC coverage enhancement terminal. In this case, the control unit 101 determines frequency allocation resources, a modulating/encoding method, and so on indicated by an instruction to be given to the MTC coverage enhancement terminal and outputs information regarding the determined parameters to the control signal generating unit 102.

The control unit 101 also determines an encoding level for control signals and outputs the determined encoding level to the encoding unit 103. The control unit 101 also determines resources (downlink resources) to which the control signals are to be mapped and outputs information regarding the determined resources to the signal allocating unit 105.

The control unit 101 also determines a coverage enhancement level for the MTC coverage enhancement terminal and outputs, to the control signal generating unit 102, information regarding the determined coverage enhancement level or the number of repetitions needed for PUSCH transmission at the determined coverage enhancement level. Also, based on the information regarding the coverage enhancement level or the number of repetitions needed for PUSCH transmission, the control unit 101 generates information regarding the value of the parameter X or parameter Y that the MTC coverage enhancement terminal uses for the PUSCH repetition. The control unit 101 outputs the generated information to the control signal generating unit 102.

The control unit 101 may independently determine the value of X regardless of the information about the SRS resource candidate group or may determine the value of X so that cross-subframe channel estimation and symbol level combining work by using the information about the SRS resource candidate group.

The control signal generating unit 102 generates control signals for the MTC coverage enhancement terminal. The control signals include a signal for a cell-specific higher layer, a signal for a UE-specific higher layer, or an uplink grant (UL grant) that gives an instruction for PUSCH allocation.

The uplink grant is constituted by a plurality of bits and includes information that gives an instruction indicating frequency allocation resources, a modulating/encoding system, and so on. The uplink grant may also include information regarding the coverage enhancement level or the number of repetitions needed for PUSCH transmission and information regarding the value of the parameter X or Y used for PUSCH repetition.

The control signal generating unit 102 generates a control-information bit sequence by using control information input from the control unit 101 and outputs the generated control-information bit sequence (control signals) to the encoding unit 103. Since the control information may be transmitted to a plurality of terminals 200, the control signal generating unit 102 generates the bit sequence by including a terminal ID of each terminal 200 in the control information for each terminal 200. For example, a cyclic redundancy check (CRC) bit masked by the terminal ID of a destination terminal is attached to the control information.

Also, the information about the SRS resource candidate group is indicated to the MTC coverage enhancement terminal (more specifically, the control unit 206 described below) by using cell-specific higher layer signals. The information regarding the coverage enhancement level or the number of repetitions needed for PUSCH transmission may be indicated to the MTC coverage enhancement terminal via signaling of a UE-specific higher layer or may be indicated using an uplink grant that gives an instruction for PUSCH allocation, as described above. Also, the information regarding the values of the parameters X and Y used for PUSCH repetition may be similarly indicated to the MTC coverage enhancement terminal via signaling of a UE-specific higher layer or may be indicated using an uplink grant that gives an instruction for PUSCH allocation. In addition, when the information regarding the values of the parameters X and Y used for PUSCH repetition is a parameter predefined in a standard, the information does not necessarily have to be indicated from the base station 100 to the terminal.

In accordance with the encoding level indicated by the instruction from the control unit 101, the encoding unit 103 encodes the control signals (the control-information bit string) received from the control signal generating unit 102 and outputs the encoded control signals to the modulating unit 104.

The modulating unit 104 modulates the control signals received from the encoding unit 103 and outputs the modulated control signals (a symbol sequence) to the signal allocating unit 105.

The signal allocating unit 105 maps the control signals (the symbol sequence), received from the modulating unit 104, to a resource indicated by the instruction from the control unit 101. A control channel to which the control signals are to be mapped may be a physical downlink control channel (PDCCH) for MTC or may be an enhanced PDCCH (EPDCCH). The signal allocating unit 105 outputs, to the IFFT unit 106, signals of a downlink subframe including PDCCH for MTC or EPDCCH to which the control signals are mapped.

The IFFT unit 106 performs IFFT processing on the signals received from the signal allocating unit 105 to thereby convert the frequency-domain signals into time-domain signals. The IFFT unit 106 outputs the time-domain signals to the CP attaching unit 107.

The CP attaching unit 107 attaches a CP to the signals received from the IFFT unit 106 and outputs, to the transmitting unit 108, signals (OFDM signals) to which the CP is attached.

The transmitting unit 108 performs radio-frequency (RF) processing, such as digital-to-analog (D/A) conversion or up-conversion, on the OFDM signals received from the CP attaching unit 107 and transmits resulting radio signals to the terminal 200 via the antenna 109.

The receiving unit 110 performs RF processing, such as down-conversion or analog-to-digital (A/D) conversion, on uplink signals (PUSCH) from the terminal 200, the uplink signals being received via the antenna 109, and outputs resulting reception signals to the CP removing unit 111. The uplink signals (PUSCH) transmitted from the terminal 200 include signals on which repetition processing over a plurality of subframes is performed.

The CP removing unit 111 removes the CP attached to the reception signals received from the receiving unit 110 and outputs, to the FFT unit 112, the signals from which the CP is removed.

The FFT unit 112 performs FFT processing on the signals received from the CP removing unit 111 to decompose the signals into signal strings in a frequency domain, extracts signals corresponding to PUSCH subframes, and outputs the extracted signals to the combining unit 113.

By using information regarding subframes in which the MTC coverage enhancement terminal performs PUSCH repetition transmission, the information being input from the control unit 101, the combining unit 113 performs coherent combining on, with respect to a PUSCH over a plurality of subframes in which the repetition transmission is performed, data signals and signals of portions corresponding to a DMRS through use of symbol level combining. The combining unit 113 outputs the combined signals to the demapping unit 114.

The demapping unit 114 extracts a PUSCH subframe portion allocated to the terminal 200 from the signals received from the combining unit 113. The demapping unit 114 also decomposes the extracted PUSCH subframe portion for the terminal 200 into DMRS and data symbols (SC-FDMA data symbols), outputs the DMRS to the channel estimating unit 115, and outputs the data symbols to the equalizing unit 116.

The channel estimating unit 115 performs channel estimation using the DMRS input from the demapping unit 114. The channel estimating unit 115 outputs obtained channel estimation values to the equalizing unit 116.

By using the channel estimation values input from the channel estimating unit 115, the equalizing unit 116 equalizes the data symbols input from the demapping unit 114. The equalizing unit 116 outputs the equalized data symbols to the demodulating unit 117.

The demodulating unit 117 applies inverse discrete Fourier transform (IDFT) processing to the SC-FDMA data symbols in the frequency domain, the data symbols being input from the equalizing unit 116, to convert the data symbols into time-domain signals and then performs data demodulation. Specifically, the demodulating unit 117 converts the symbol sequence into a bit string on the basis of a modulation system indicated by the instruction given to the terminal 200 and outputs the obtained bit string to the decoding unit 118.

The decoding unit 118 performs error correction decoding on the bit string input from the demodulating unit 117 and outputs the decoded bit string to the determining unit 119.

The determining unit 119 performs error detection on the bit string input from the decoding unit 118. The error detection is performed using a CRC bit attached to the bit string. When a determination result of the CRC bit indicates that there is no error, the determining unit 119 extracts the received data and outputs an acknowledgement (ACK). On the other hand, when the determination result of the CRC bit indicates that there is error, the determining unit 119 outputs a negative acknowledgement (NACK). The ACK and NACK output by the determining unit 119 are used for re-transmission control processing in a processing unit, which is not illustrated.

[Configuration of Terminal]

Figure 9:
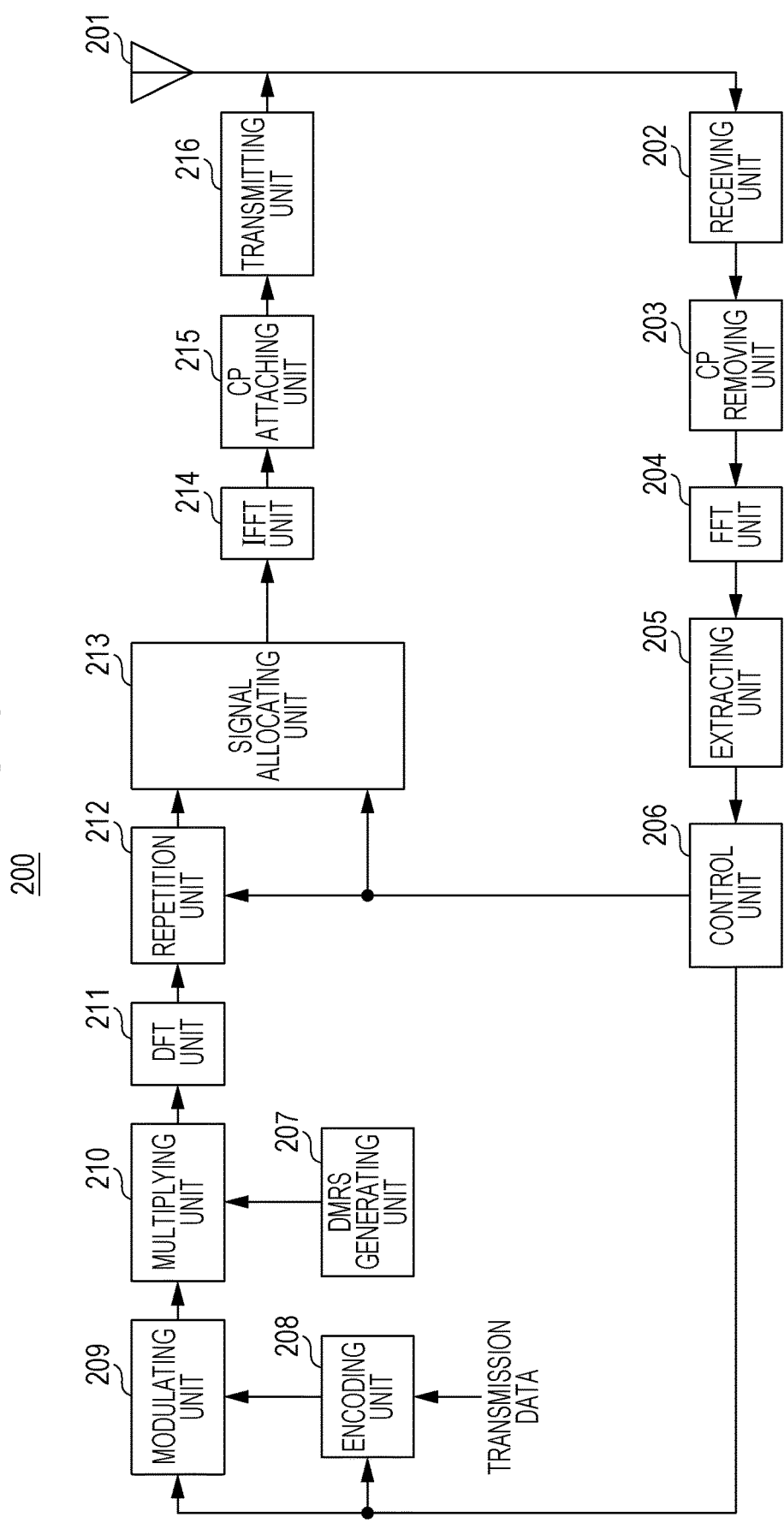
FIG. 9 is a block diagram illustrating the configuration of the terminal according to the first embodiment.

FIG. 9 is a block diagram illustrating the configuration of the terminal 200 according to the first embodiment of the present disclosure. In FIG. 9, the terminal 200 has an antenna 201, a receiving unit 202, a CP removing unit 203, an FFT unit 204, an extracting unit 205, the control unit 206, a DMRS generating unit 207, an encoding unit 208, a modulating unit 209, a multiplying unit 210, a DFT unit 211, the repetition unit 212, a signal allocating unit 213, an IFFT unit 214, a CP attaching unit 215, and the transmitting unit 216.

The receiving unit 202 performs RF processing, such as down-conversion or AD conversion, on the radio signals (PDCCH for MTC or EPDCCH) received from the base station 100 via the antenna 201 to obtain baseband OFDM signals. The receiving unit 202 outputs the OFDM signals to the CP removing unit 203.

The CP removing unit 203 removes the CP attached to the OFDM signals received from the receiving unit 202 and outputs, to the FFT unit 204, signals from which the CP is removed.

By performing FFT processing on the signals received from the CP removing unit 203, the FFT unit 204 converts the time-domain signals into frequency-domain signals. The FFT unit 204 outputs the frequency-domain signals to the extracting unit 205.

The extracting unit 205 performs blind decoding on the frequency-domain signals (PDCCH for MTC or EPDCCH) received from the FFT unit 204 and attempts to decode control signals sent to the terminal 200. A CRC masked by the terminal ID of the terminal is attached to the control signals sent to the terminal 200. Thus, when CRC determination is successful as a result of the blind decoding, the extracting unit 205 extracts the control information and outputs the control information to the control unit 206.

The control unit 206 controls PUSCH transmission on the basis of the control signals input from the extracting unit 205. Specifically, on the basis of the PUSCH resource allocation information included in the control signals, the control unit 206 gives, to the signal allocating unit 213, an instruction for resource allocation during PUSCH transmission. Also, on the basis of encoding/modulating system information included in the control signals, the control unit 206 gives, to the encoding unit 208, an instruction indicating an encoding system during PUSCH transmission and gives, to the modulating unit 209, an instruction indicating a modulation system during PUSCH transmission.

Also, when the control signals include the information regarding the coverage enhancement level or the information regarding the number of repetitions needed for the PUSCH transmission, the control unit 206 determines the number of repetitions during PUSCH repetition transmission, on the basis of the included information. The control unit 206 gives, to the repetition unit 212, an instruction for the information indicating the determined number of repetitions. Also, when the control signal includes information regarding the value of the parameter X or Y used for PUSCH repetition, the control unit 206 gives, to the signal allocating unit 213, an instruction for the resource allocation during PUSCH repetition transmission, on the basis of the included information.

Also, when the information regarding the coverage enhancement level or the information regarding the number of repetitions needed for the PUSCH transmission is indicated from the base station 100 by using a higher layer, the control unit 206 determines the number of repetitions during PUSCH repetition transmission, on the basis of the indicated information. The control unit 206 gives an instruction indicating the determined information to the repetition unit 212. Similarly, when the information regarding the value of the parameter X or Y used for PUSCH repetition is indicated from the base station 100 by using a higher layer, the control unit 206 gives, to the signal allocating unit 213, an instruction for resource allocation during PUSCH repetition transmission, on the basis of the indicated information.

Also, the control unit 206 identifies, in the SRS resource candidate group indicated from the base station 100 by using a cell-specific higher layer, subframes in which PUSCH repetition transmission is performed, and outputs the identified subframes to the signal allocating unit 213.

The DMRS generating unit 207 generates a DMRS and outputs the generated DMRS to the multiplying unit 210.

The encoding unit 208 attaches a CRC bit, masked by the terminal ID of the terminal 200, to input transmission data (uplink data), performs error-correction encoding, and outputs an encoded bit string to the modulating unit 209.

The modulating unit 209 modulates the bit string received from the encoding unit 208 and outputs modulated signals (a data symbol sequence) to the multiplying unit 210.

The multiplying unit 210 performs time multiplexing on the data symbol sequence input from the modulating unit 209 and the DMRS input from the DMRS generating unit 207 and outputs multiplexed signals to the DFT unit 211.

The DFT unit 211 applies a DFT to the signals input from the multiplying unit 210 to generate frequency-domain signals and outputs the generated frequency-domain signals to the repetition unit 212.

When the local terminal is in an MTC coverage enhancement mode, the repetition unit 212 repeats the signals input from the DFT unit 211 over a plurality of subframes to generate repetition signals, on the basis of the number of repetitions indicated by the instruction from the control unit 206. The repetition unit 212 outputs the repetition signals to the signal allocating unit 213.

The signal allocating unit 213 maps the signals, received from the repetition unit 212, to PUSCH time/frequency resources indicated by the instruction from the control unit 206. The signal allocating unit 213 outputs, to the IFFT unit 214, the PUSCH signals to which the signals are mapped.

The IFFT unit 214 generates time-domain signals by performing IFFT processing on the frequency-domain PUSCH signals input from the signal allocating unit 213. The IFFT unit 214 outputs the generated signals to the CP attaching unit 215.

The CP attaching unit 215 attaches a CP to the time-domain signals received from the IFFT unit 214 and outputs, to the transmitting unit 216, the signals to which the CP is attached.

The transmitting unit 216 performs RF processing, such as D/A conversion or up-conversion, on the signals received from the CP attaching unit 215 and transmits radio signals to the base station 100 via the antenna 201.

[Operations of Base Station 100 and Terminal 200]

A detailed description will be given of operations of the base station 100 and the terminal 200 having the above-described configurations.

The following description will be given of a case in which the SRS transmission period ($T_{SFC}$) is 5 or 10 and only one SRS transmission candidate subframe exists in the SRS transmission period ($T_{SFC}$) (i.e., a case in which $\Delta_{SFC}$ has only one value). That is, the description will be given of a case of srs-SubframeConfig=3, 4, 5, 6, 9, 10, 11, 12 illustrated in FIG. 2.

The base station 100 indicates srs-SubframeConfig to the terminal 200 in cell-specific higher layer signaling for setting an SRS resource candidate group.

Also, the base station 100 indicates the number of repetitions ($N_{Rep}$) to the terminal 200 before PUSCH transmission/reception. The number of repetitions ($N_{Rep}$) may be indicated from the base station 100 to the terminal 200 via a UE-specific higher layer or may be indicated using PDCCH for MTC.

The base station 100 may also indicate the value of the parameter X to the terminal 200 before PUSCH transmission/reception.

The terminal 200 performs repetition transmission on a PUSCH a number of times corresponding to the number of repetitions ($N_{Rep}$) indicated from the base station 100. When the number of repetitions ($N_{Rep}$) is larger than X, the terminal 200 transmits the repetition signals in X consecutive subframes by using the same resource, then changes the 1.4 MHz frequency band (an MTC narrowband) through frequency hopping, and again transmits the repetition signals in X consecutive subframes by using the same resource, as illustrated in FIG. 5. That is, with respect to the repetition signals, frequency hopping is performed every X consecutive subframes of $N_{Rep}$ subframes. As illustrated in FIG. 5, a retuning time (e.g., corresponding to one subframe) is reserved during the frequency hopping.

In this case, the terminal 200 sets a timing for transmitting the repetition signals on the basis of srs-SubframeConfig (information indicating SRS transmission candidate subframes) indicated from the base station 100. Specifically, in PUSCH repetition transmission, the terminal 200 maps the repetition signals (an MTC narrowband), transmitted in X consecutive subframes, so as not to overlap the SRS transmission candidate subframes indicated by srs-SubframeConfig.

Figure 10:
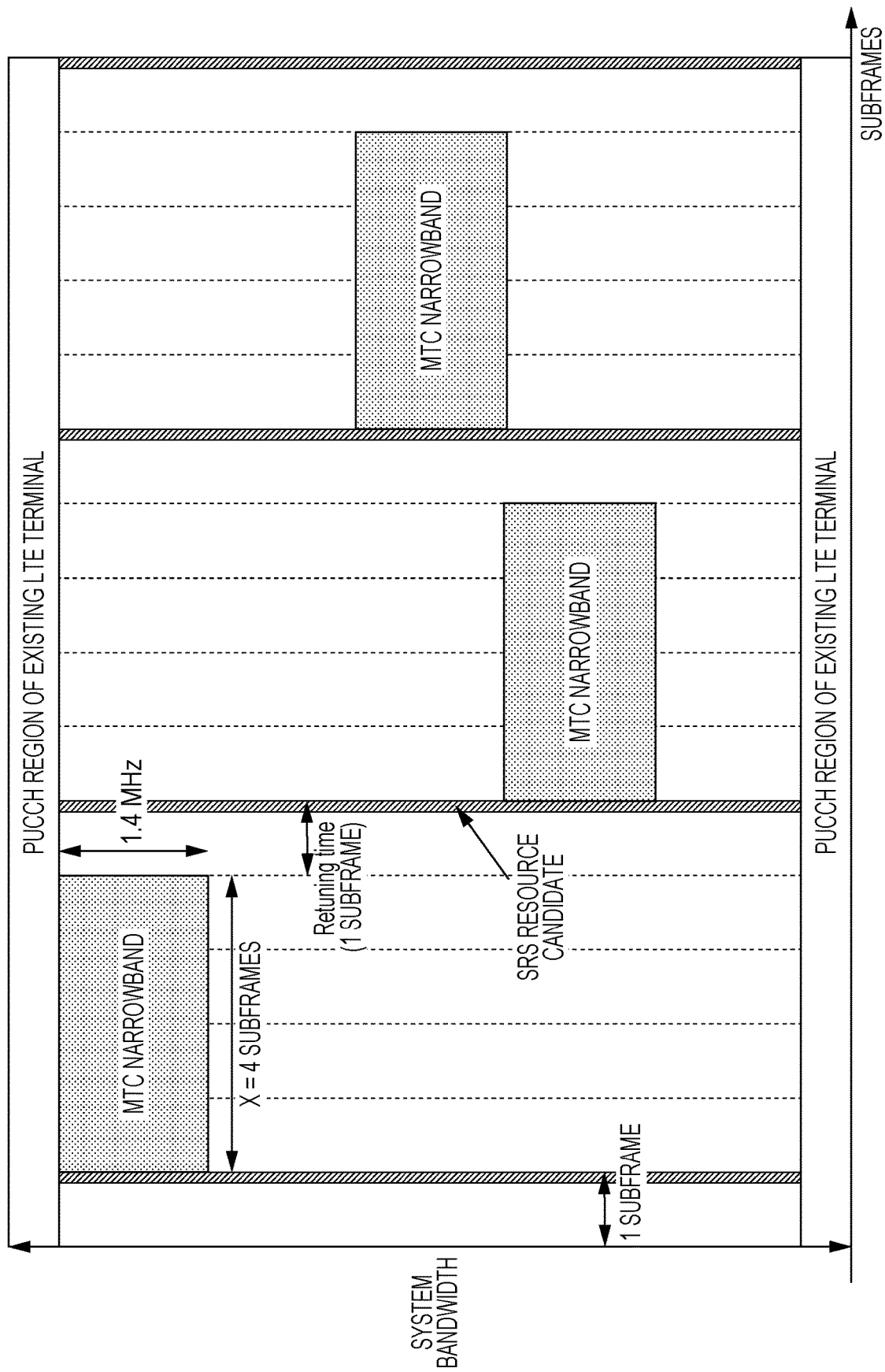
FIG. 10 is a diagram illustrating an arrangement example of MTC narrowbands according to the first embodiment.

FIG. 10 illustrates a mapping example of signals in MTC narrowbands for srs-SubframeConfig=3 and X=4. Also, in FIG. 10, it is assumed that the number of repetitions $N_{Rep}$=12.

For srs-SubframeConfig=3, the SRS transmission period ($T_{SFC}$)=5 and $\Delta_{SFC}$=0 are given (see FIG. 2). Thus, in FIG. 10, a first subframe, a sixth subframe, an 11th subframe, and a 16th subframe are SRS transmission candidate subframes. That is, in FIG. 10, the number of consecutive subframes that are not set in the SRS transmission candidate subframes is five subframes.

In FIG. 10, the terminal 200 transmits the repetition signals in the second to fifth four consecutive subframes, the seventh to tenth four consecutive subframes, and the 12th to 15th four consecutive subframes. That is, the individual X=4 subframes to which the repetition signals are mapped are consecutive subframes that are not set in the SRS transmission candidate subframes. Thus, the repetition signals (the MTC narrowband) continuously transmitted in X subframes are mapped to the subframes so as not to overlap the SRS transmission candidate subframes indicated by srs-SubframeConfig.

In this case, in FIG. 10, the value of X (X=4) is smaller than the SRS transmission period ($T_{SFC}$)=5. That is, the value of X (X=4) is smaller than or equal to the number of consecutive subframes (4 subframes) that are not set in the SRS transmission candidate subframes. The same also applies to a case of srs-SubframeConfig=4, 5, 6 in which the transmission period ($T_{SFC}$) and the number of $\Delta_{SFC}$ are the same as those in the case of srs-SubframeConfig=3. That is, in the case of srs-SubframeConfig=3, 4, 5, 6, it is possible to perform cross-subframe channel estimation and symbol level combining over X=2, 3, 4 subframes. Similarly, in the case of srs-SubframeConfig=9, 10, 11, 12, the number of consecutive subframes that are not set in the SRS transmission candidate subframes is nine subframes, thus making it possible to perform cross-subframe channel estimation and symbol level combining over X=2, 3, 4, 5, 6, 7, 8, 9 subframes.

That is, any of values that are smaller than or equal to the number of consecutive subframes that are not set in the SRS transmission candidate subframes is set for the parameter X, which is a unit of processing for the cross-subframe channel estimation and the symbol level combining. As described above, when the value of X is smaller than or equal to the number of consecutive subframes that are not set in the SRS transmission candidate subframes (or is smaller than the transmission period $T_{SFC}$), the terminal 200 can map the repetition signals to subframes other than the SRS transmission candidate subframes. Thus, the terminal 200 can map the repetition signals transmitted in X consecutive subframes in which the cross-subframe channel estimation and the symbol level combining are to be performed, while avoiding the SRS transmission candidate subframes.

Also, in the example in FIG. 10, the first subframes of the X=4 subframes (the MTC narrowbands) in which the repetition signals are continuously transmitted are set in the second subframe, the seventh subframe, and the 12th subframe, which are the next subframes of the SRS transmission candidate subframes. With this setting, the terminal 200 can map the repetition signals by making best use of the consecutive subframes that are not set in SRS transmission candidate subframes.

In particular, when the value of X is smaller than or equal to the number of consecutive subframes that are not set in the SRS transmission candidate subframes, the terminal 200 can map the repetition signals, while reliably avoiding SRS transmission candidate subframes by setting the first subframes of X subframes in the next subframes of the corresponding SRS transmission candidate subframes.

Similarly to the terminal 200, the base station 100 also sets (identifies) a timing of subframes in which the repetition signals in PUSCH repetition are transmitted from the terminal 200, on the basis of srs-SubframeConfig set for the terminal 200. The base station 100 then performs coherent combining on the repetition signals transmitted over a plurality of subframes, on the basis of the set subframe timing.

As described above, in the present embodiment, the base station 100 and the terminal 200 set the timing for transmitting the PUSCH repetition signals, on the basis of the SRS transmission candidate subframes indicated by srs-SubframeConfig. In accordance with the SRS transmission candidate subframes, the base station 100 and the terminal 200 adjust the transmission timing of the repetition signals to be transmitted in consecutive X subframes, thereby making it possible to avoid a collision between a repetition transmission of an MTC coverage enhancement terminal and an SRS of an existing LTE system.

In addition, since a value smaller than or equal to the number of consecutive subframes that are not set in the SRS transmission candidate subframes is set for the parameter X for continuous transmission of the repetition signals, the X subframes include no SRS transmission candidate subframe, and thus phase discontinuity does not occur in the repetition transmission signals.

Thus, according to the present embodiment, in the base station 100, cross-subframe channel estimation and symbol level combining using X subframes are performed to thereby make it possible to improve the channel estimation accuracy and the reception quality.

In FIG. 10, the description has been given of a case in which the first subframes for the repetition signals (the MTC narrowbands) in PUSCH repetition are set in the next subframes of the SRS transmission candidate subframes. However, the repetition signals (the MTC narrowbands) are not limited to a case in which they include the next subframes of the SRS transmission candidate subframes, and the repetition signals may be mapped to any of consecutive subframes in which the SRS transmission candidate subframes are not set. That is, it is sufficient that the X subframes be mapped to consecutive subframes that are not set in SRS transmission candidate subframes. For example, the last subframes for the repetition signals (the MTC narrowbands) may be set in the respective subframes one before the SRS transmission candidate subframes.

Second Embodiment

As described above, the parameter Y is a frequency hopping cycle obtained by adding the retuning time (in this case, one subframe) to X consecutive subframes (X≤Y).

Figure 11:
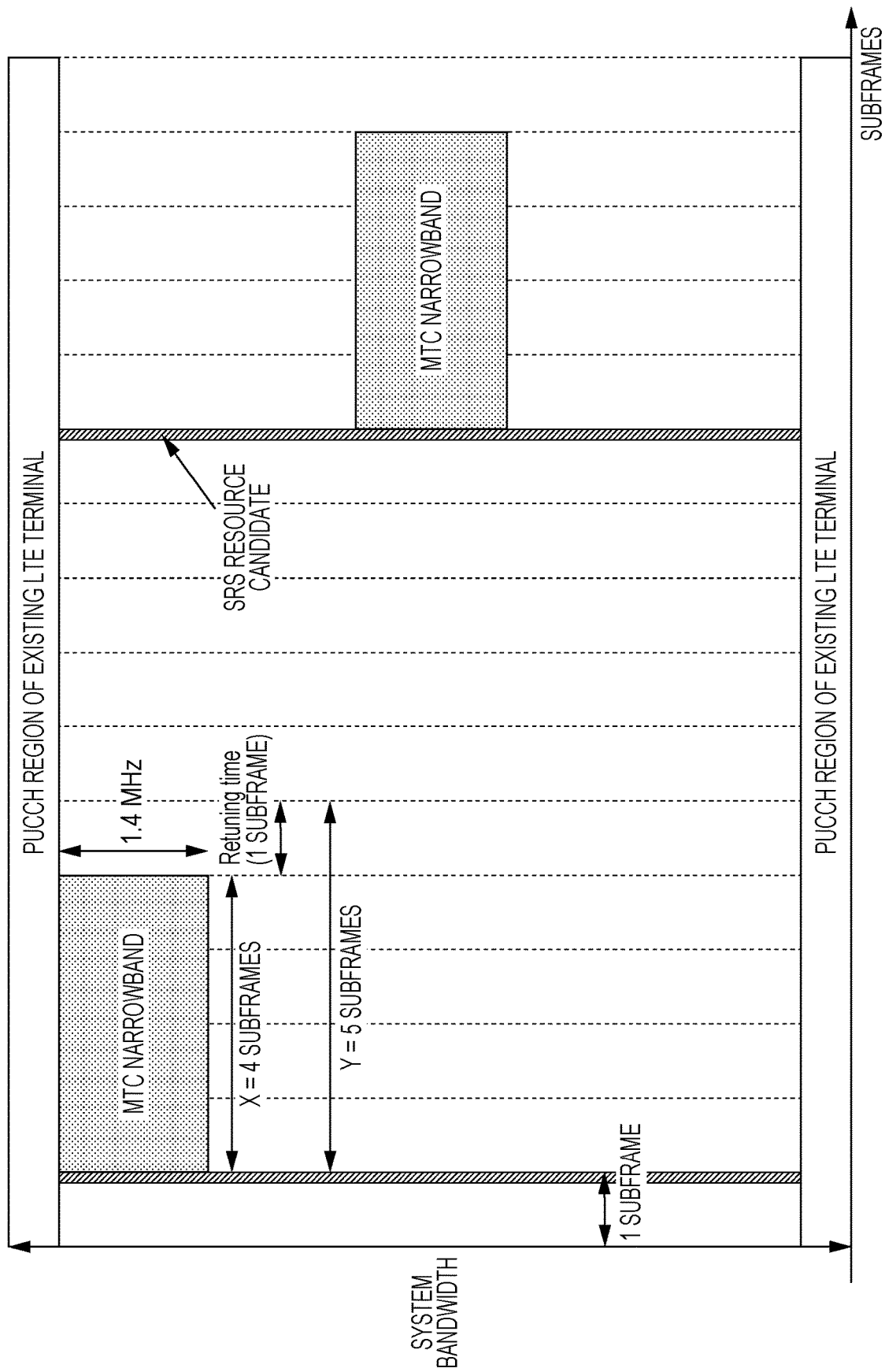
FIG. 11 is a diagram illustrating an arrangement example of MTC narrowbands.

FIG. 11 illustrates a mapping example of signals in MTC narrowbands in the case of srs-SubframeConfig=9, X=4, and Retuning time=1 subframe (i.e., Y=5).

Also, in FIG. 11, the repetition signals are mapped so that the first subframes of X=4 subframes in which the repetition signals are continuously transmitted are the next subframes of SRS transmission candidate subframes. That is, in FIG. 11, the second and 12th subframes, which are the next subframes of the SRS transmission candidate subframes, are the first subframes of X=4 subframes.

In this case, for srs-SubframeConfig=9, the SRS transmission period ($T_{SFC}$)=10 and $\Delta_{SFC}$=0 are given, and thus the transmission period $T_{SFC}$ has twice the length of Y. Also, for srs-SubframeConfig=9, the number of consecutive subframes that are not set in the SRS transmission candidate subframes is nine subframes. That is, in FIG. 11, of the 9 consecutive subframes that are not set in the SRS transmission candidate subframes, the subframes other than the four subframes in which the repetition signals (the MTC narrowband) are mapped and one subframe set for the retuning time are four subframes. The number of remaining subframes is equal to the parameter X.

As described above, for $T_{SFC}$≥Y (n is an integer greater than or equal to 2), when the first subframes of X subframes in which the repetition signals are continuously transmitted are aligned to the next subframes of the SRS transmission candidate subframes indicated by srs-SubframeConfig, as illustrated in FIG. 11, as in the first embodiment, there is a possibility that the transmission efficiency decreases depending on srs-SubframeConfig.

Accordingly, in the present embodiment, a description will be given of a method for mapping the repetition signals in accordance with srs-SubframeConfig and the parameter X and the retuning time (i.e., the parameter Y) without a reduction in the transmission efficiency.

Since a base station and a terminal according to the present embodiment have the same basic configurations as those of the base station 100 and the terminal 200 according to the first embodiment, a description will be given using FIGS. 8 and 9.

The following description will be given of a case in which the SRS transmission period ($T_{SFC}$) is 5 or 10 and only one SRS transmission candidate subframe exists in the SRS transmission period ($T_{SFC}$) (i.e., a case in which $\Delta_{SFC}$ has only one value), as in the first embodiment. That is, a description will be given of a case of srs-SubframeConfig=3, 4, 5, 6, 9, 10, 11, 12 illustrated in FIG. 2.

The base station 100 indicates srs-SubframeConfig to the terminal 200 in cell-specific higher layer signaling for setting an SRS resource candidate group.

The base station 100 also indicates the number of repetitions ($N_{Rep}$) to the terminal 200 before PUSCH transmission/reception. The number of repetitions ($N_{Rep}$) may be indicated from the base station 100 to the terminal 200 via an UE-specific higher layer or may be indicated using PDCCH for MTC.

The base station 100 also indicates the values of the parameter X and the parameter Y to the terminal 200 before PUSCH transmission/reception.

The terminal 200 indicates repetition transmission on a PUSCH a number of times corresponding to the number of repetitions ($N_{Rep}$) reported from the base station 100. When the number of repetitions ($N_{Rep}$) is larger than X, the terminal 200 transmits the repetition signals in X consecutive subframes by using the same resource, then changes the 1.4 MHz frequency band (an MTC narrowband) through frequency hopping, and again transmits the repetition signals in X consecutive subframes by using the same resource, as illustrated in FIG. 5. As illustrated in FIG. 5, a retuning time (e.g., corresponding to one subframe) is reserved during the frequency hopping.

In the present embodiment, the terminal 200 maps the repetition signals (i.e., the MTC narrowbands), transmitted in X consecutive subframes in PUSCH repetition transmission, to subframes so as not to overlap the SRS transmission candidate subframes indicated by srs-SubframeConfig.

In the present embodiment, for $T_{SFC} \geq nY$ (n is larger than or equal to 2), the first subframe of a subset of n sets of X subframes in which the repetition signals are continuously transmitted is aligned to the next subframe of the corresponding SRS transmission candidate subframe indicated by srs-SubframeConfig. Also, the frequency hopping is allowed to be performed n-1 times in the SRS transmission period ($T_{SFC}$).

That is, the terminal 200 transmits, in units of X subframes, the repetition signals to be transmitted inn sets of X subframes in the SRS transmission period ($T_{SFC}$). In this case, each time n is reached, the terminal 200 aligns the first subframes of X subframes in which the repetition signals are continuously transmitted to the next subframes of the SRS transmission candidate subframes indicated by srs-SubframeConfig. That is, the first subframe of a subset constituted by n sets of X subframes is set in the next subframe of the corresponding SRS transmission candidate subframe.

Figure 12:
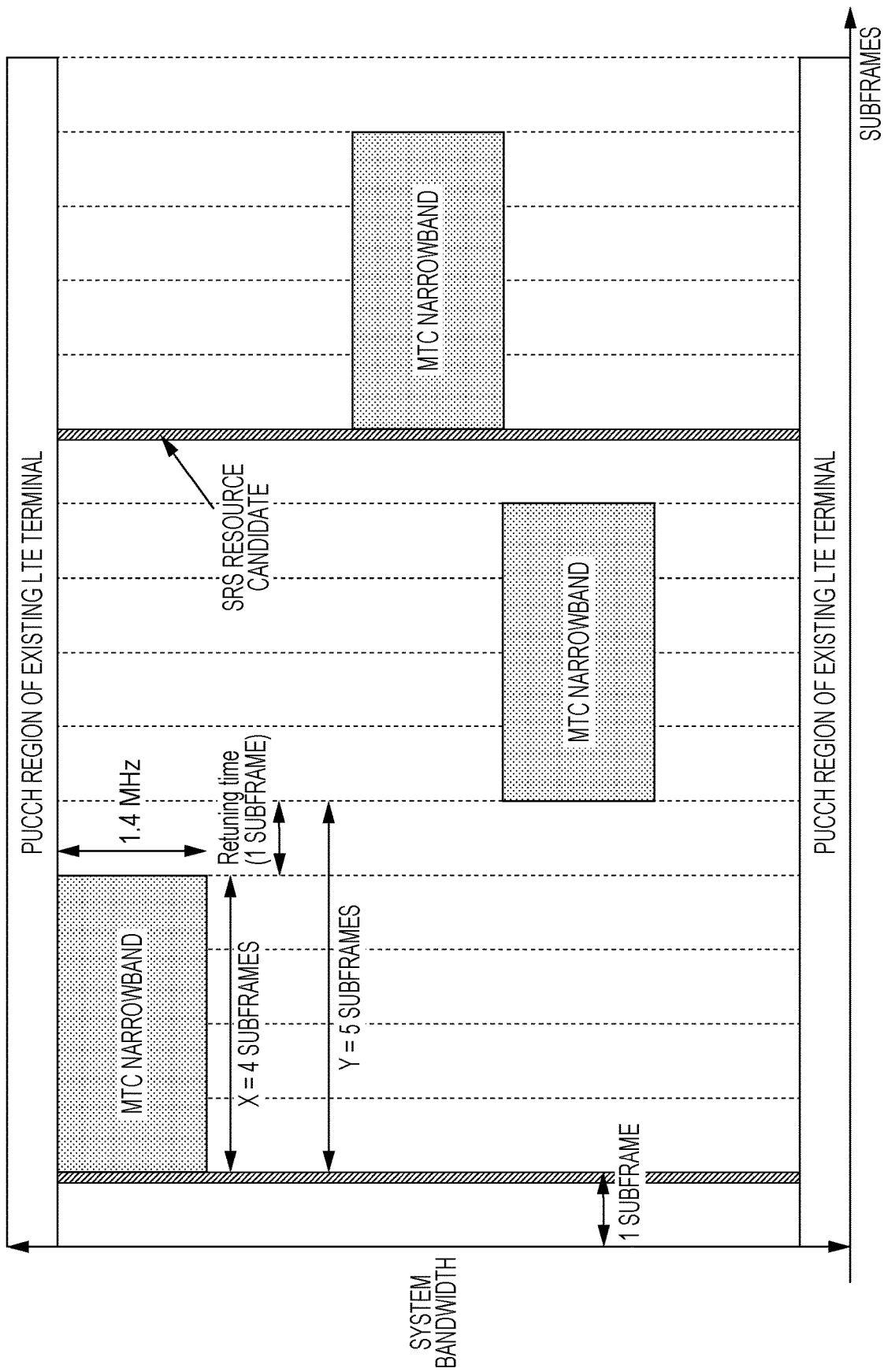
FIG. 12 is a diagram illustrating an arrangement example of MTC narrowbands according to a second embodiment.

FIG. 12 illustrates a mapping example of signals in MTC narrowbands in the case of srs-SubframeConfig=9, X=4, and Retuning time=1 subframe (i.e., Y=5). That is, in FIG. 12, a relationship $T_{SFC} 2 \times Y$ (n=2) is satisfied.

As illustrated in FIG. 12, the repetition signals are mapped to the second to fifth subframes, the seventh to 10th subframes, and the 12th to 15th subframes. In this case, as illustrated in FIG. 12, the first subframe of the second to fifth subframes and the first subframe of the 12th to 15th subframes are the next subframes of SRS transmission candidate subframes. That is, as illustrated in FIG. 12, each time n=2 is reached, the terminal 200 aligns the first subframe of X subframes in which the repetition signals are continuously transmitted to the next subframe of the SRS transmission candidate subframe indicated by srs-SubframeConfig. The terminal 200 then performs frequency hopping n-1 times in the SRS transmission period ($T_{SFC}$=10).

That is, the first subframe of a subset constituted by n=2 sets of X subframes is aligned to the next subframe of an SRS transmission candidate subframe. As a result, this subset is mapped to consecutive subframes (in FIG. 12, nine subframes) that are not set in SRS transmission candidate subframes. Also, in this subset, frequency hopping is performed once (i.e., n-1=1) in the SRS transmission period ($T_{SFC}$)=10 subframes.

As described above, in the present embodiment, when the SRS transmission period $T_{SFC}$ is larger than or equal to n times of the value Y obtained by adding the value of X and the retuning time (n is an integer greater than or equal to 2), the first subframe of a subset constituted by n sets of X subframes is set in the next subframe of an SRS transmission candidate subframe.

With this setting, in the SRS transmission period, the repetition signals can be mapped to subframes that are not set in an SRS transmission candidate subframe. Thus, it is possible to prevent a reduction in the transmission efficiency as much as possible.

Also, as in the first embodiment, it is possible to avoid a collision between a repetition transmission of an MTC coverage enhancement terminal and an SRS transmission of an existing system. As a result, since phase discontinuity does not occur in repetition transmission signals, cross-subframe channel estimation and symbol level combining using X subframes are performed in the base station 100 to thereby make it possible to improve the channel estimation accuracy and the reception quality.

In the present embodiment, a case in which the value of nY is smaller than or equal to $T_{SFC}$ ($T_{SFC} \geq nY$) is assumed. That is, for srs-SubframeConfig=3, 4, 5, 6 (a case in which $T_{SFC}$ is 5 and the number of $\Delta_{SFC}$ is one), cross-subframe channel estimation and symbol level combining over X=2 subframes work (however, only for X=Y), and for srs-SubframeConfig=9, 10, 11, 12 (a case in which $T_{SFC}$ is 10 and the number of $\Delta_{SFC}$ is one), cross-subframe channel estimation and symbol level combining over X=2, 3, 4 subframes work.

Third Embodiment

Since a base station and a terminal according to the present embodiment have the same basic configurations as those of the base station 100 and the terminal 200 according to the first embodiment, a description will be given using FIGS. 8 and 9.

The following description will be given of a case in which the SRS transmission period ($T_{SFC}$) is 2, 5, or 10 and only one SRS transmission candidate subframe exists in the SRS transmission period ($T_{SFC}$) (i.e., a case in which $\Delta_{SFC}$ has only one value). That is, a description will be given of a case of srs-SubframeConfig=1, 2, 3, 4, 5, 6, 9, 10, 11, 12 illustrated in FIG. 2.

Also, in the present embodiment, assume a case in which the value of X is larger than the number of consecutive subframes that are not set in SRS transmission candidate subframes (a case in which the value of X larger than or equal to the transmission period $T_{SFC}$). That is, for srs-SubframeConfig=1, 2 ($T_{SFC}$=2), X≥2 is given; for srs-SubframeConfig=3, 4, 5, 6 ($T_{SFC}$=5), X≥5 is given; and for srs-SubframeConfig=9, 10, 11, 12 ($T_{SFC}$=10), X≥10 is given.

The base station 100 indicate srs-SubframeConfig to the terminal 200 in cell-specific higher layer signaling for setting an SRS resource candidate group.

The base station 100 also indicates the number of repetitions ($N_{Rep}$) to the terminal 200 before PUSCH transmission/reception. The number of repetitions ($N_{Rep}$) may be indicated from the base station 100 to the terminal 200 via an UE-specific higher layer or may be indicated using PDCCH for MTC.

The base station 100 may also indicate the value of the parameter X to the terminal 200 before PUSCH transmission/reception.

The terminal 200 performs repetition transmission on a PUSCH a number of times corresponding to the number of repetitions ($N_{Rep}$) reported from the base station 100. When the number of repetitions ($N_{Rep}$) is larger than X, the terminal 200 transmits the repetition signals in X consecutive subframes by using the same resource, then changes the 1.4 MHz frequency band (an MTC narrowband) through frequency hopping, and again transmits the repetition signals in X consecutive subframes by using the same resource, as illustrated in FIG. 5. As illustrated in FIG. 5, a retuning time (e.g., corresponding to one subframe) is reserved during the frequency hopping.

In this case, in PUSCH repetition transmission, the terminal 200 aligns the first subframes of X subframes in which the repetition signals are continuously transmitted to the next subframes of the SRS transmission candidate subframes indicated by srs-SubframeConfig. Also, the terminal 200 punctures a symbol that is a candidate to which an SRS is to be mapped, the symbol being included in the SRS transmission candidate subframe of the subframes in which the repetition signals are transmitted (in this case, the last SC-FDMA symbol in the subframe).

Figure 13:
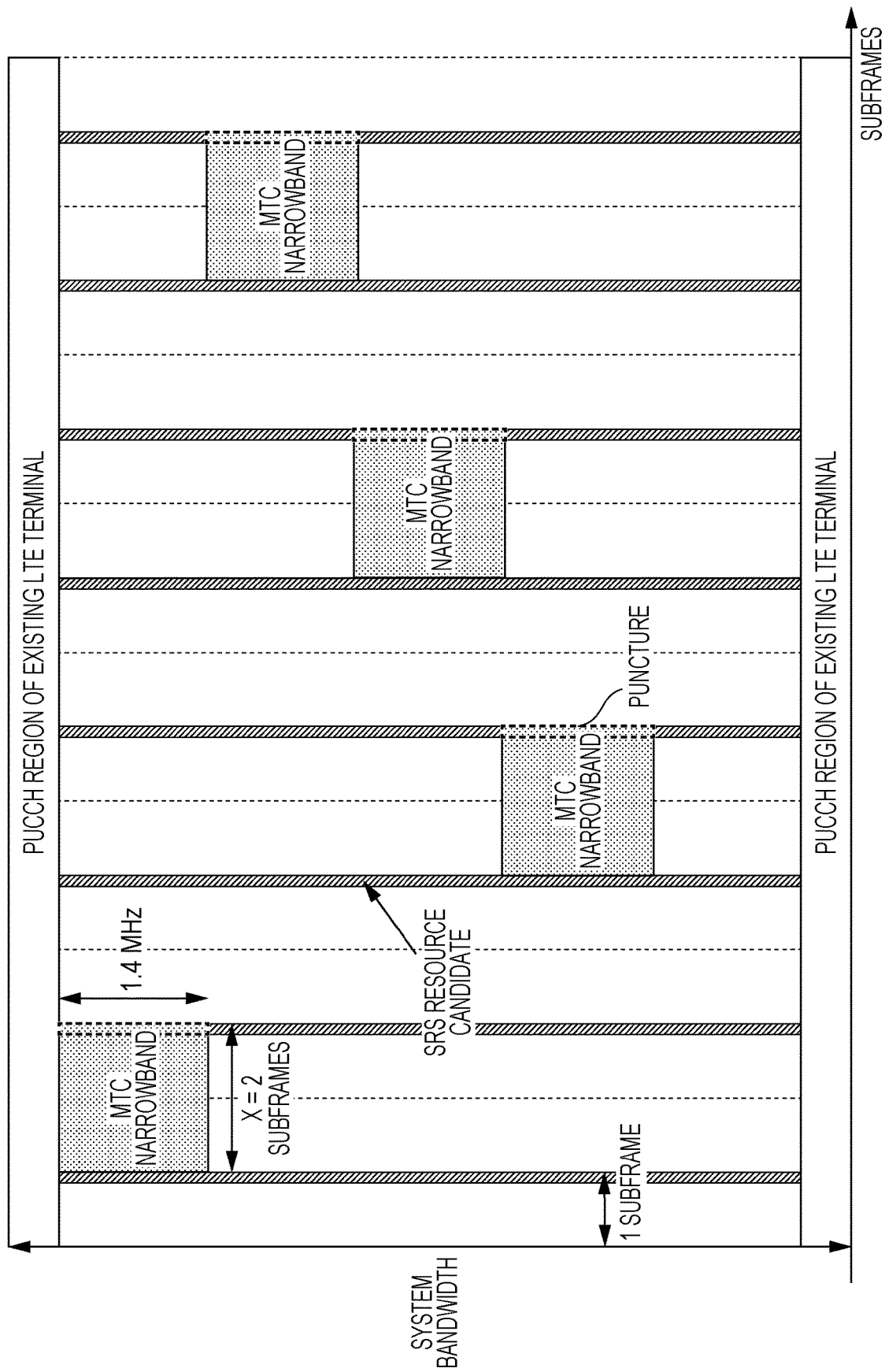
FIG. 13 is a diagram illustrating an arrangement example of MTC narrowbands according to a third embodiment.

FIG. 13 illustrates a mapping example of signals in MTC narrowbands for srs-SubframeConfig=3 and X=2. That is, in FIG. 13, $T_{SFC}$=X is given.

As illustrated in FIG. 13, each first subframe of X=2 subframes is set in the next subframe of an SRS transmission candidate subframe.

However, in FIG. 13, the value of X (X=2) is the same as the SRS transmission period $T_{SFC}$ and is larger than the number of consecutive subframes (one subframe) that are not set in an SRS transmission candidate subframe. Thus, one or more subframes (in FIG. 13, one subframe) in the transmission segment in X subframes are SRS transmission candidate subframes. That is, when the value of X is larger than or equal to the transmission period $T_{SFC}$, there is a possibility that the repetition signals (data signals) and an SRS collide with each other in one or more subframes.

As described above, the terminal 200 prevents a collision between an SRS and data signals, by not performing data transmission in the last SC-FDMA symbol (an SRS resource candidate) in each SRS transmission candidate subframe. To this end, in the present embodiment, after mapping data to 12 SC-FDMA symbols except for DMRSs in one subframe illustrated in FIG. 1, as in other subframes, the terminal 200 punctures the last SC-FDMA symbol as a format for transmitting data in SRS transmission candidate subframes.

The first subframe of X subframes in which the repetition signals are continuously transmitted is allocated to the next subframe of each SRS transmission candidate subframe indicated by srs-SubframeConfig, as described above, and thus, in the case of X=$T_{SFC}$, the last subframe (the second subframe) of the X subframes overlaps the SRS transmission candidate subframe, as illustrated in FIG. 13. Thus, the symbol in which the terminal 200 does not perform data transmission (i.e., the symbol that is punctured) is only the last SC-FDMA symbol the last subframe of X subframes.

As a result, phase discontinuity due to the puncture occurs only in one last symbol in X subframes. In other words, phase continuity is maintained in the symbols other than the last symbol in X subframes. Hence, it is possible to minimize an influence that the phase discontinuity has on the cross-subframe channel estimation and the symbol level combining over X subframes.

In contrast, in FIG. 13, if the first subframe of X=2 subframes in which the repetition signals are continuously transmitted is shifted forward by one subframe, the first subframe of the X=2 subframes overlaps the SRS transmission candidate subframe, and thus the last SC-FDMA symbol in the subframe is punctured. In this case, since the transmission-signal phase discontinuity occurs between the first subframe and the second subframe, the base station 100 cannot perform the cross-subframe channel estimation and the symbol level combining over the X=2 subframes.

As described above, the first subframe of X=2 subframes in which the repetition signals are continuously transmitted is aligned to the next subframe of an SRS transmission candidate subframe, as illustrated in FIG. 13, to thereby allow the base station 100 to perform the cross-subframe channel estimation and the symbol level combining over X=2 subframes (except for the last symbol in the second subframe), thereby making it possible to improve the channel estimation accuracy and the reception quality.

Figure 14:
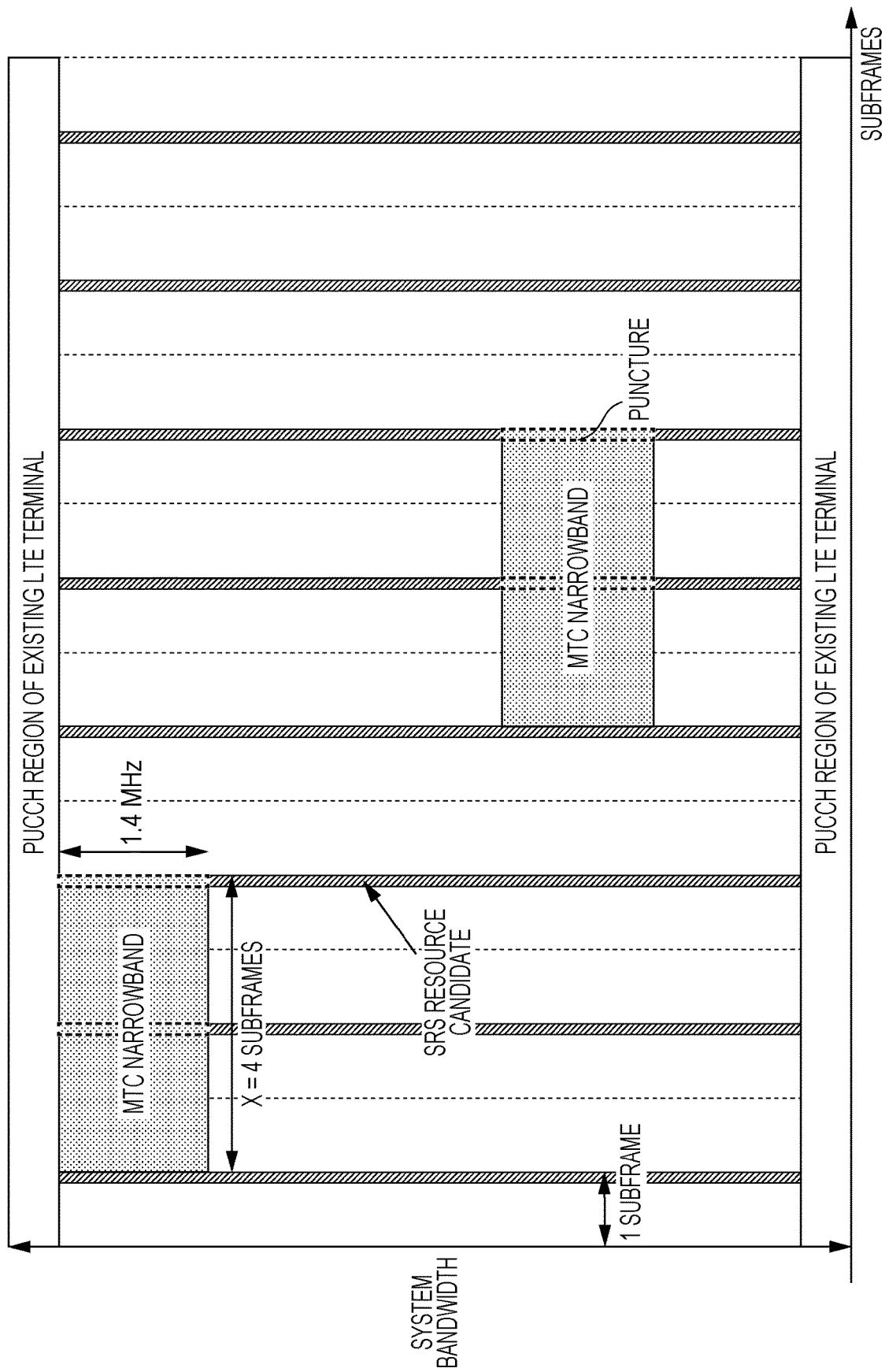
FIG. 14 is a diagram illustrating an arrangement example of MTC narrowbands according to the third embodiment.

FIG. 14 illustrates a mapping example of signals in MTC narrowbands for srs-SubframeConfig=3 and X=4. That is, in FIG. 14, $T_{SFC}$<X is given.

For X>$T_{SFC}$, in the middle subframe of X subframes, data signals overlap SRS transmission candidate subframes. In FIG. 14, in two subframes, that is, the second and fourth subframes, of X=4 subframes, data signals overlap SRS transmission candidate subframes. Accordingly, in FIG. 14, the terminal 200 punctures the last SC-FDMA symbols in the two subframes, that is, the second and fourth subframes, of the X=4 subframes.

In this case, when a case in which the first subframe of the X=4 subframes in which the repetition signals are continuously transmitted, as illustrated in FIG. 14, is shifted forward by one subframe is assumed, the last SC-FDMA symbols in the first and third subframes of the X=4 subframes are punctured. In this case, the transmission-signal phase discontinuity occurs between the first subframe and the second subframe, and further, the transmission-signal phase discontinuity also occurs between the third subframe and the fourth subframe. As a result, the cross-subframe channel estimation and the symbol level combining over X=2 subframes can be performed only using the second and third subframes.

In contrast, in the present embodiment, the first subframe of the X=4 subframes is aligned to the next subframe of each SRS transmission candidate subframe indicated by srs-SubframeConfig, as illustrated in FIG. 14. As a result, the last SC-FDMA symbols in the second and fourth subframes of X=4 subframes are punctured. In this case, although the number of SC-FDMA symbols punctured in the above-described assumption is the same, the phase discontinuity occurs only between the second subframe and the third subframe.

Hence, the base station 100 can perform the cross-subframe channel estimation and the symbol level combining over X=2 subframes by using a set of the first and second subframes and a set of the third and fourth subframes, thus making it possible to improve the channel estimation accuracy and the reception quality.

As described above, in the present embodiment, the first subframe of X subframes in which the repetition signals are continuously transmitted is set in the next subframe of each SRS transmission candidate subframe reported by srs-SubframeConfig. With this setting, it is possible to minimize an influence that the phase discontinuity has on the cross-subframe channel estimation and the symbol level combining over X subframes. Also, it is possible to improve the channel estimation accuracy and the reception quality.

Fourth Embodiment

Since a base station and a terminal according to the present embodiment have the same basic configurations as those of the base station 100 and the terminal 200 according to the first embodiment, a description will be given using FIGS. 8 and 9.

The following description will be given of a case in which the SRS transmission period ($T_{SFC}$) is 5 or 10 and two or more SRS transmission candidate subframes exist in the SRS transmission period ($T_{SFC}$) (i.e., a case in which $\Delta_{SFC}$ has two or more values). That is, a description will be given of a case of srs-SubframeConfig=7, 8, 13, 14 illustrated in FIG. 2.

The base station 100 indicates srs-SubframeConfig to the terminal 200 in cell-specific higher layer signaling for setting an SRS resource candidate group.

The base station 100 also indicates the number of repetitions ($N_{Rep}$) to the terminal 200 before PUSCH transmission/reception. The number of repetitions ($N_{Rep}$) may be indicated from the base station 100 to the terminal 200 via an UE-specific higher layer or may be indicated using PDCCH for MTC.

The base station 100 may also indicate the value of the parameter X to the terminal 200 before PUSCH transmission/reception.

The terminal 200 performs repetition transmission on a PUSCH a number of times corresponding to the number of repetitions ($N_{Rep}$) indicated from the base station 100. When the number of repetitions ($N_{Rep}$) is larger than X, the terminal 200 transmits the repetition signals in X consecutive subframes by using the same resource, then changes the 1.4 MHz frequency band (an MTC narrowband) through frequency hopping, and again transmits the repetition signals in X consecutive subframes by using the same resource, as illustrated in FIG. 5. As illustrated in FIG. 5, a retuning time (e.g., corresponding to one subframe) is reserved during the frequency hopping.

In this case, in the PUSCH repetition transmission, the terminal 200 aligns the first subframe of X subframes in which the repetition signals are continuously transmitted to a subframe that is next to an SRS transmission candidate subframe indicated by srs-SubframeConfig and that is not set in an SRS transmission candidate subframe.

Figure 15:
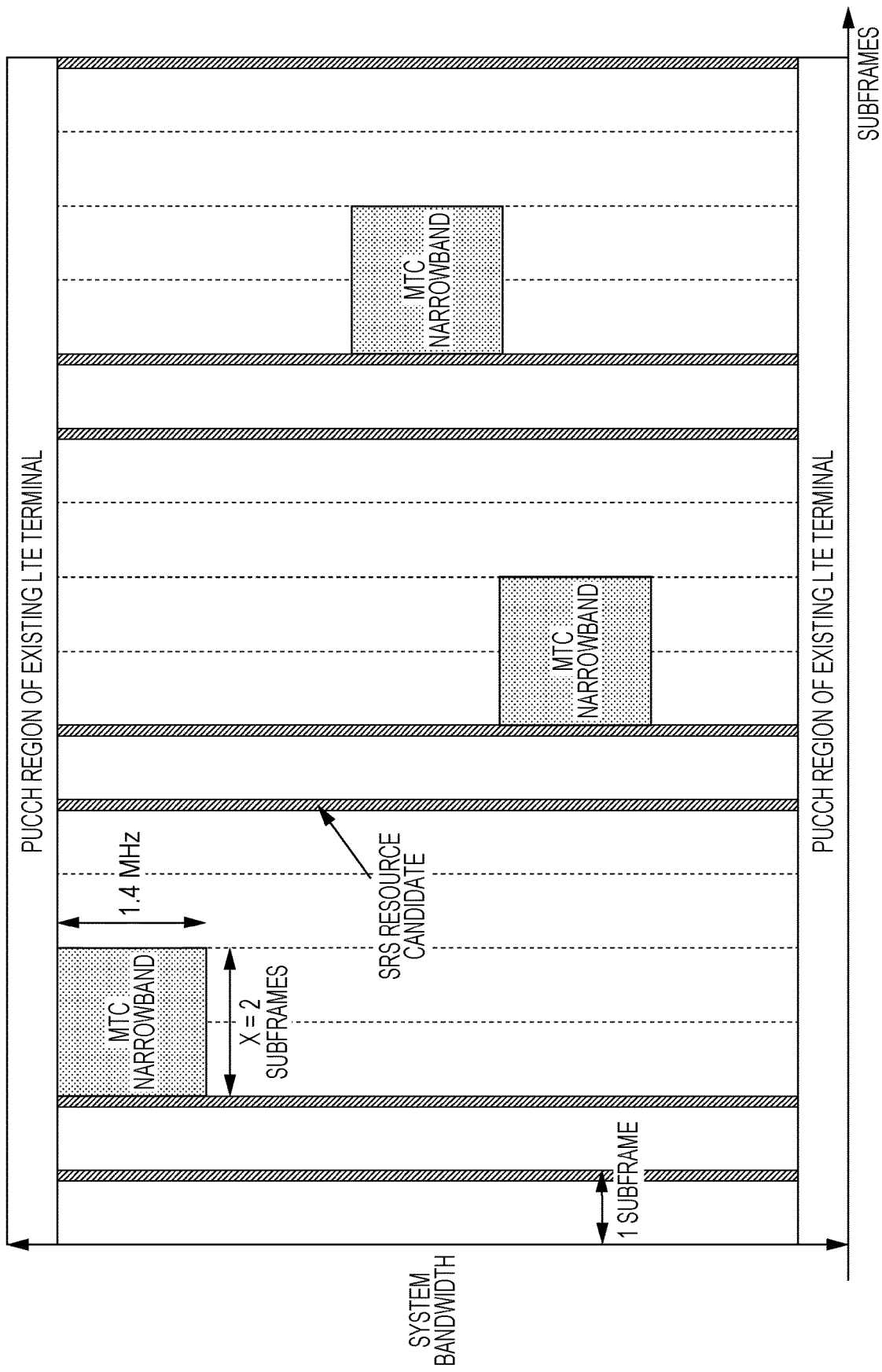
FIG. 15 is a diagram illustrating an arrangement example of MTC narrowbands according to a fourth embodiment.

FIG. 15 illustrates a mapping example of signals in MTC narrowbands for srs-SubframeConfig=7 and X=2.

As illustrated in FIG. 15, for srs-SubframeConfig=7, the SRS transmission period ($T_{SFC}$)=5 is given, and the number of SRS transmission candidate subframes in the SRS transmission period ($T_{SFC}$) is two ($\Delta_{SFC}$={0, 1}). That is, the first subframe, the second subframe, the sixth subframe, the seventh subframe, . . . , the (5n+1)th subframe, and the (5n+2)th subframe are SRS transmission candidate subframes.

In this case, as illustrated in FIG. 15, the respective first subframes of X=2 subframes are set in the subframes that are next to the SRS transmission candidate subframes and that are other than the SRS transmission candidate subframes. In FIG. 15, the respective first subframes of X=2 subframes are the third subframe, the eighth subframe, . . . , and the (5n+3)th subframe.

Also, in FIG. 15, the value of X (X=2) is smaller than or equal to the number of consecutive subframes (three subframes) that are not set in the SRS transmission candidate subframes. The same also applies to a case of srs-SubframeConfig=8 in which the transmission period ($T_{SFC}$) and the number of $\Delta_{SFC}$ are the same as those in the case of srs-SubframeConfig=7. That is, in the case of srs-SubframeConfig=7, 8, it is possible to perform the cross-subframe channel estimation and the symbol level combining over X=2 subframes.

That is, any of values that are smaller than or equal to the number of consecutive subframes that are not set in the SRS transmission candidate subframes is set for the parameter X, which is a unit of processing for the cross-subframe channel estimation and the symbol level combining. Thus, when the value of X is smaller than or equal to the number of consecutive subframes that are not set in the SRS transmission candidate subframes, the terminal 200 can map the repetition signals to subframes other than the SRS transmission candidate subframes. Thus, the terminal 200 can map the repetition signals transmitted in X consecutive subframes in which the cross-subframe channel estimation and the symbol level combining are to be performed, while avoiding the SRS transmission candidate subframes.

Also, in the example illustrated in FIG. 15, the first subframe of X=2 subframes in which the repetition signals are continuously transmitted is set in the subframe that is next to an SRS transmission candidate subframe and that is not set in an SRS transmission candidate subframe. With this setting, the terminal 200 can map the repetition signals by making best use of the consecutive subframes that are not set in SRS transmission candidate subframes. In particular, when the value of X is smaller than or equal to the number of consecutive subframes that are not set in SRS transmission candidate subframes, the terminal 200 can map the repetition signals, while reliably avoiding SRS transmission candidate subframes by setting the first subframe of X subframes in the subframe that is next to the SRS transmission candidate subframe and that is not set in the SRS transmission candidate subframe.

According to the present embodiment, even when there are a plurality of SRS transmission candidate subframes in the SRS transmission period ($T_{SFC}$), it is possible to avoid a collision between a repetition transmission of an MTC coverage enhancement terminal and an SRS transmission of an existing system, as described above. As a result, since phase discontinuity does not occur in repetition transmission signals, cross-subframe channel estimation and symbol level combining using X subframes are performed in the base station 100 to thereby make it possible to improve the channel estimation accuracy and the reception quality.

Figure 1:
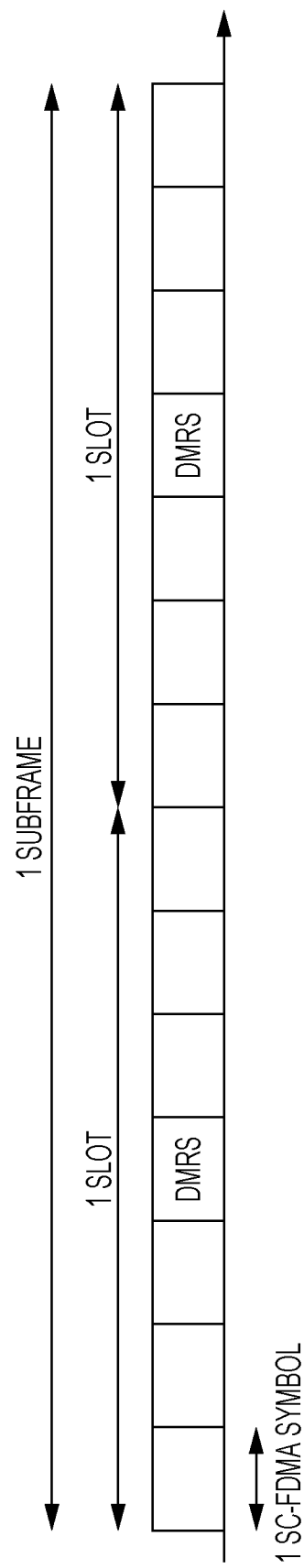
FIG. 1 is a diagram illustrating one example of a subframe structure of PUSCH.
Figure 3:
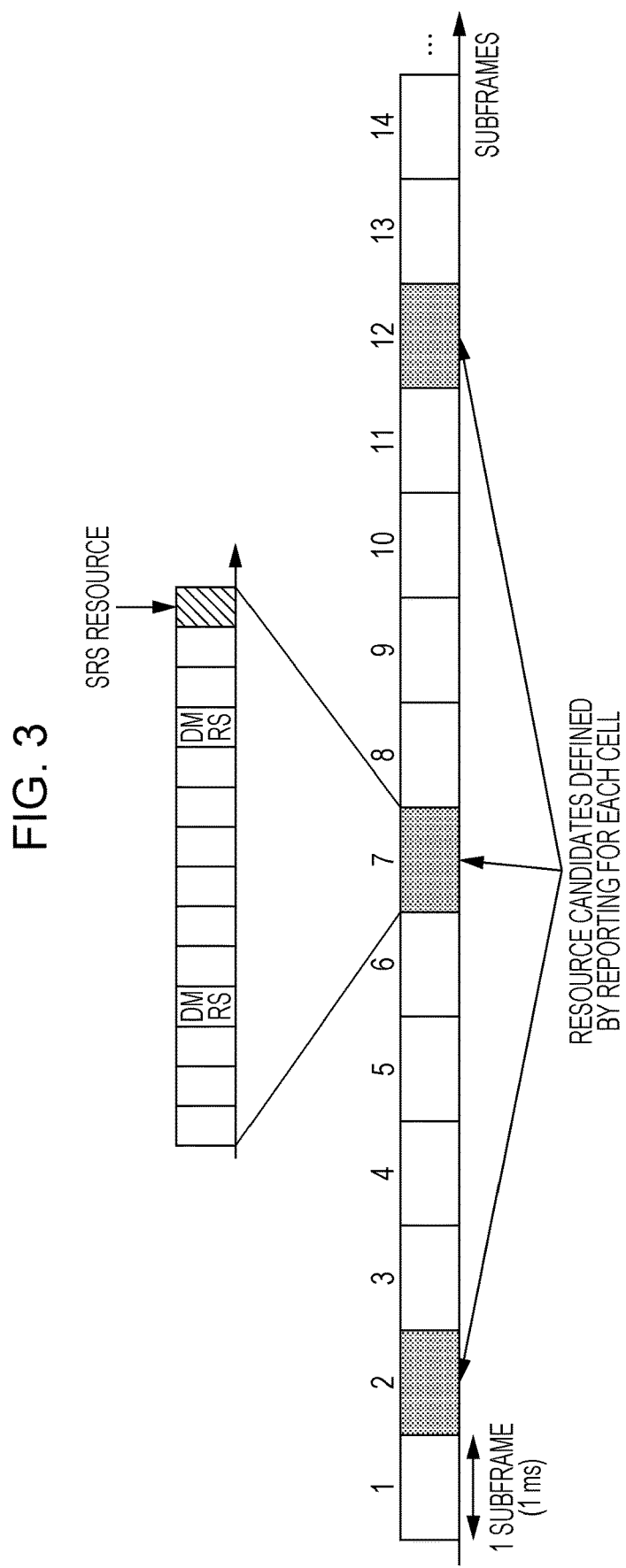
FIG. 3 is a diagram illustrating SRS transmission candidate subframes and a setting example of SRS resources.
Figure 4:
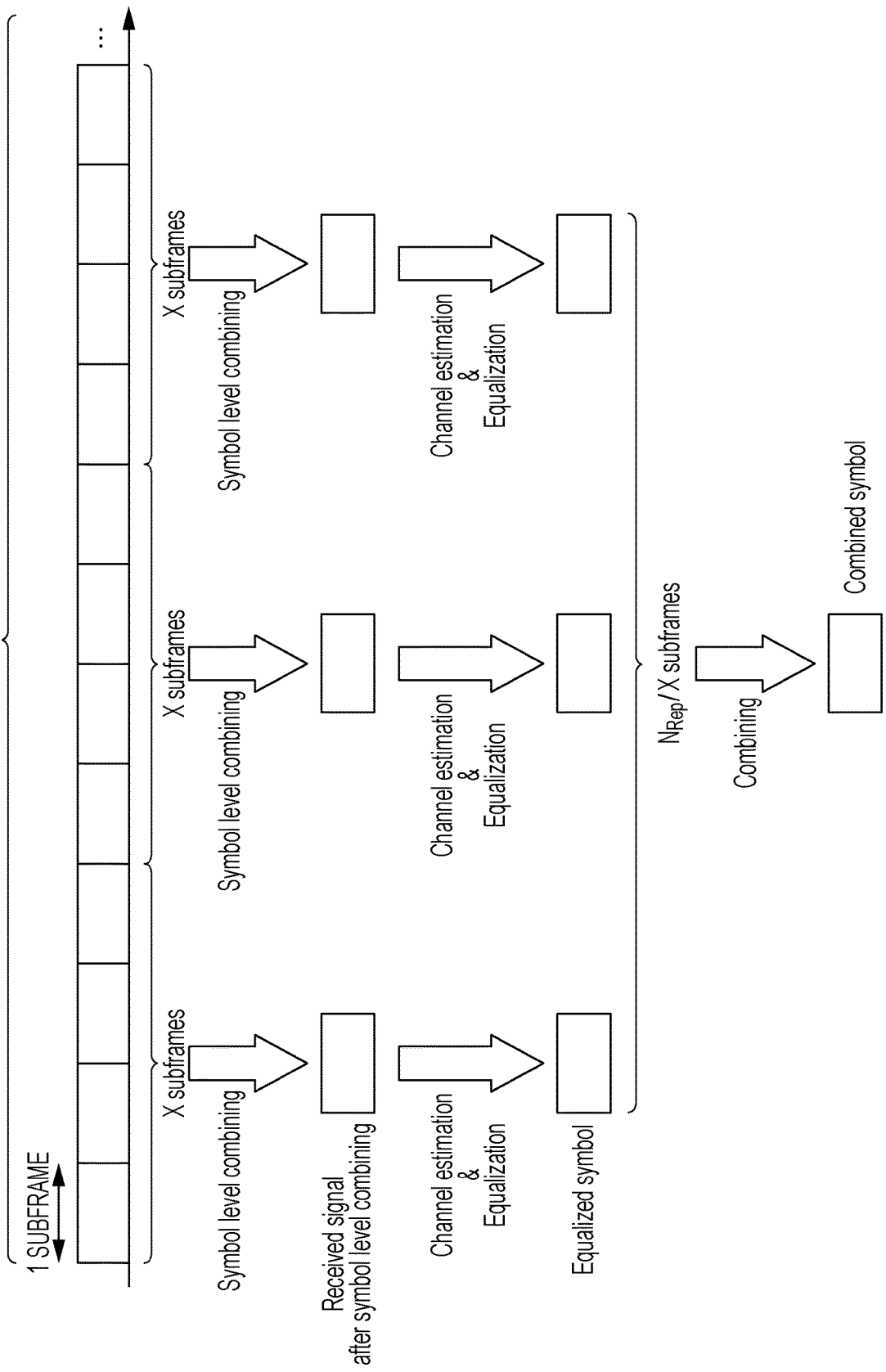
FIG. 4 is an operation example of cross-subframe channel estimation and symbol level combining.

In a case (not illustrated) in which the value of X is the same as or larger than the number of consecutive subframes that are not set in SRS transmission candidate subframes, it is sufficient that after mapping data to 12 SC-FDMA symbols except for DMRSs in one subframe illustrated in FIG. 1, as in other subframes, the terminal 200 punctures the last SC-FDMA symbol (corresponding to an SRS resource candidate) as a format for transmitting data in SRS transmission candidate subframe, as in the third embodiment. In this case, the first subframe of X subframes in which the repetition signals are continuously transmitted is aligned to a subframe that is next to an SRS transmission candidate subframe indicated by srs-SubframeConfig and that is not set in an SRS transmission candidate subframe, thereby making it possible to avoid an influence that the phase discontinuity has on the cross-subframe channel estimation and the symbol level combining or making it possible to minimize the influence, as in the third embodiment.

The above description has been given of each embodiment of the present disclosure.

In the above embodiment, the repetition transmission of PUSCH has been described as one example, the repetition transmission is not limited to PUSCH and may be any signals that are transmitted in resources (MTC narrowbands) for MTC terminals, as illustrated in FIGS. 11 to 15. For example, for repetition transmission of an uplink control channel (Physical Uplink Control Channel (PUCCH)), the repetition signals may also be transmitted, as in the first to fourth embodiments. Specifically, in PUCCH repetition, the first subframe of X subframes in which the repetition signals are continuously transmitted may be aligned to a subframe that is next to an SRS transmission candidate subframe indicated by srs-SubframeConfig or to a subframe that is next to an SRS transmission candidate subframe indicated by srs-SubframeConfig and that is not set in an SRS transmission candidate subframe. With this setting, it is possible to prevent a collision between a PUCCH repetition transmission of an MTC coverage enhancement terminal and an SRS of an existing system. Thus, the base station 100 can improve the channel estimation accuracy and the reception quality by performing cross-subframe channel estimation and symbol level combining. Also, as in the third and fourth embodiments, when one or more subframes collide with an SRS transmission candidate subframe in a transmission segment in X subframes, the transmission may be performed using a Shortened PUCCH format in order to avoid a collision with an SRS.

Also, in the above embodiment, the description has been given of a case in which the first subframe of X subframes in which the repetition signals are continuously transmitted is aligned to a subframe that is next to the SRS transmission candidate subframe indicated by srs-SubframeConfig or to a subframe that is next to the SRS transmission candidate subframe indicated by srs-SubframeConfig and that is not set in the SRS transmission candidate subframe. However, it is conceivable that, in the standards, only the first subframe in which repetition signals are transmitted $N_{Rep}$ times is defined. For example, definition may be performed such that the PUSCH repetition transmission is to be started from an n+k subframe, where n is the last subframe in a downlink control channel (PDCCH) for MTC in which repetition transmission is performed (k indicates the next subframe of the SRS transmission candidate subframe reported by srs-SubframeConfig or a subframe that is next to the SRS transmission candidate subframe reported by srs-SubframeConfig, that is not set in the SRS transmission candidate subframe, and that satisfies k≥4).

Also, the number of repetitions, the value of the parameter X or Y, and the values of the parameters defined by srs-SubframeConfig, which are used in the above-described embodiments, are examples and are not limited thereto.

Also, although the description in the embodiments has been given of an example in which one aspect of the present disclosure is realized using hardware, the present disclosure can also be realized using software in cooperation with hardware.

Also, the individual functional blocks used in the description of the above embodiments are typically realized as a large-scale integration (LSI), which is an integrated circuit. The integrated circuit may control the individual functional blocks used in the description of the embodiments and may have an input and an output. The functional blocks may be individually integrated into single chips or they may be integrated into a single chip so as to include one or more thereof. Although the functional blocks are implemented as an LSI in this case, they may also be called an integrated circuit (IC), a system LSI, a super LSI, or an ultra LSI depending on a difference in the degree of integration.

The scheme for implementing an integrated circuit is not limited to the LSI and may be realized with a dedicated circuit or a general-purpose processor. A field programmable gate array (FPGA) that can be programmed after manufacture of an LSI or a reconfigurable processor that allows reconfiguration of connections and settings of circuit cells inside an LSI may also be used.

In addition, when a technology for circuit integration that replaces LSI becomes available with the advancement of semiconductor technology or other derivative technology, the functional blocks may naturally be integrated using the technology. Application of biotechnology and so on are possible.

A terminal in the present disclosure has a configuration including: a repeater that generates repetition signals by repeating uplink signals over a plurality of subframes; a controller that sets a timing for transmitting the repetition signals, based on information indicating a transmission candidate subframe for an SRS used for measuring an uplink reception quality; and a transmitter that transmits the repetition signals at the set timing.

In the terminal in the present disclosure, a base station performs coherent combining on the repetition signals every predetermined number of subframes of the plurality of subframes; and a first subframe of the predetermined number of subframes is a next subframe of the transmission candidate subframe.

In the terminal in the present disclosure, a base station performs coherent combining on the repetition signals every predetermined number of subframes of the plurality of subframes; the predetermined number is smaller than a transmission period of the SRS; and the predetermined number of subframes are consecutive subframes that are not set in the transmission candidate subframe.

In the terminal in the present disclosure, a base station performs coherent combining on the repetition signals every predetermined number of subframes of the plurality of subframes; frequency hopping is performed on the repetition signals every predetermined number of subframes; and a transmission period of the SRS is larger than or equal to n times of a value obtained by adding the predetermined number and the number of subframes required for frequency-band switching in the frequency hopping (n is an integer greater than or equal to 2), a first subframe of a subset constituted by an n sets of the predetermined number of subframes is a next subframe of the transmission candidate subframe.

In the terminal in the present disclosure, in the transmission period of the SRS, frequency hopping is performed on the repetition signals (n-1) times.

In the terminal in the present disclosure, a base station performs coherent combining on the repetition signals every predetermined number of subframes of the plurality of subframes; and when the predetermined number is larger than or equal to the transmission period of the SRS, the controller punctures a symbol that is a candidate to which the SRS is to be mapped, the symbol being included in the transmission candidate subframe of subframes in which the repetition signals are transmitted.

In the terminal in the present disclosure, a base station performs coherent combining on the repetition signals every predetermined number of subframes of the plurality of subframes; and a first subframe of the predetermined number of subframes is a subframe that is next to the transmission candidate subframe and that is other than the transmission candidate subframe.

A base station in the present disclosure has a configuration including: a controller that sets a timing at which a terminal transmits repetition signals generated by repeating uplink signals over a plurality of subframes, based on information indicating a transmission candidate subframe for an SRS used for measuring an uplink reception quality; a receiver that receives the repetition signals; and a combiner that performs in-phase combining on the repetition signals in the plurality of subframes, based on the set timing.

A transmission method in the present disclosure includes: generating repetition signals by repeating uplink signals over a plurality of subframes; setting a timing for transmitting the repetition signals, based on information indicating a transmission candidate subframe for an SRS used for measuring an uplink reception quality; and transmitting the repetition signals at the set timing.

A reception method in the present disclosure includes: setting a timing at which a terminal transmits repetition signals generated by repeating uplink signals over a plurality of subframes, based on information indicating a transmission candidate subframe for an SRS used for measuring an uplink reception quality; receiving the repetition signals; and performing coherent combining on the repetition signals in the plurality of subframes, based on the set timing.

One aspect of the present disclosure is useful for mobile communications systems and so on.

The invention claimed is:

1. A communication apparatus comprising:
control circuitry; and
a transmitter, which is coupled to the control circuitry; wherein:
in a first case in which the control circuitry performs a physical uplink shared channel (PUSCH) mapping of PUSCH repetition signals in a plurality of subframes, the control circuitry punctures a part of the PUSCH repetition signals in a resource in a last single-carrier frequency-division multiple access (SC-FDMA) symbol of a sounding reference signal (SRS) transmission candidate subframe of the plurality of subframes, wherein the resource is counted for the PUSCH mapping of the PUSCH repetition signals, and
the transmitter transmits a remaining part of the PUSCH repetition signals apart from the punctured part of the PUSCH repetition signals; and
in a second case in which the control circuitry performs a physical uplink control channel (PUCCH) mapping of PUCCH repetition signals in a plurality of subframes and a frequency hopping of the PUCCH repetition signals every subset of subframes in the plurality of subframes, the control circuitry uses a shortened PUCCH format in two or more SRS transmission candidate subframes of the plurality of subframes and uses a normal PUCCH format in the plurality of subframes apart from the two or more SRS transmission candidate subframes, wherein if a number of subframes of the subset of subframes is less than a period between the two or more SRS transmission candidate subframes, a part of the PUCCH repetition signals for the subset of subframes is mapped to the period using the normal PUCCH format, and
the transmitter transmits the PUCCH repetition signals.

2. The communication apparatus according to claim 1, wherein in the second case in which the control circuitry performs the PUCCH mapping, the control circuitry does not puncture a last SC-FDMA symbol in the two or more SRS transmission candidate subframes.

3. The communication apparatus according to claim 1, wherein the two or more SRS transmission candidate subframes are signaled by a base station.

4. The communication apparatus according to claim 1, wherein an SRS is transmitted in the last SC-FDMA symbol of the two or more SRS transmission candidate subframes.

5. The communication apparatus according to claim 1, wherein phase continuity of the PUSCH repetition signals is maintained in symbols of the PUSCH repetition signals other than the last SC-FDMA symbol in the two or more SRS transmission candidate subframes.

6. The communication apparatus according to claim 1, wherein symbol level combining of the PUSCH repetition signals is possible.

7. The communication apparatus according to claim 1, wherein a first subframe for the PUCCH repetition signals is set in a subframe that is next to one of the two or more SRS transmission candidate subframes and that is not itself one of the two or more SRS transmission candidate subframes.

8. The communication apparatus according to claim 1, wherein a collision is avoided between subframes for the PUCCH repetition signals and the two or more SRS transmission candidate subframes.

9. A communication method comprising:
in a first case of performing a physical uplink shared channel (PUSCH) mapping of PUSCH repetition signals in a plurality of subframes,
puncturing a part of the PUSCH repetition signals in a resource in a last single-carrier frequency-division multiple access (SC-FDMA) symbol of a sounding reference signal (SRS) transmission candidate subframe of the plurality of subframes, wherein the resource is counted for the PUSCH mapping of the PUSCH repetition signals, and
transmitting a remaining part of the PUSCH repetition signals apart from the punctured part of the PUSCH repetition signals; and
in a second case of performing a physical uplink control channel (PUCCH) mapping of PUCCH repetition signals in a plurality of subframes and a frequency hopping of the PUCCH repetition signals every subset of subframes in the plurality of subframes,
using a shortened PUCCH format in two or more SRS transmission candidate subframes of the plurality of subframes and using a normal PUCCH format in the plurality of subframes apart from the two or more SRS transmission candidate subframes, wherein if a number of subframes of the subset of subframes is less than a period between the two or more SRS transmission candidate subframes, a part of the PUCCH repetition signals for the subset of subframes is mapped to the period using the normal PUCCH format, and
transmitting the PUCCH repetition signals.

10. The communication method according to claim 9, wherein in the second case of performing the PUCCH mapping, a last SC-FDMA symbol in the two or more SRS transmission candidate subframes is not punctured.

11. The communication method according to claim 9, wherein the two or more SRS transmission candidate subframes are signaled by a base station.

12. The communication method according to claim 9, wherein an SRS is transmitted in the last SC-FDMA symbol of the two or more SRS transmission candidate subframes.

13. The communication method according to claim 9, wherein phase continuity of the PUSCH repetition signals is maintained in symbols of the PUSCH repetition signals other than the last SC-FDMA symbol in the two or more SRS transmission candidate subframes.

14. The communication method according to claim 9, wherein symbol level combining of the PUSCH repetition signals is possible.

15. The communication method according to claim 9, wherein a first subframe for the PUCCH repetition signals is set in a subframe that is next to one of the two or more SRS transmission candidate subframes and that is not itself one of the two or more SRS transmission candidate subframes.

16. The communication method according to claim 9, wherein a collision is avoided between subframes for the PUCCH repetition signals and the two or more SRS transmission candidate subframes.

\* \* \* \* \*